United States Patent
Shiono et al.

(10) Patent No.: US 12,372,698 B2
(45) Date of Patent: Jul. 29, 2025

(54) OPTICAL FILTER

(71) Applicant: AGC Inc., Tokyo (JP)

(72) Inventors: Kazuhiko Shiono, Fukushima (JP);
Takuro Shimada, Fukushima (JP);
Yuichiro Orita, Fukushima (JP);
Kiyokazu Endo, Fukushima (JP);
Takahiro Sakagami, Shizuoka (JP);
Takashi Nagata, Shizuoka (JP);
Katsushi Kamijyo, Shizuoka (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 19/067,252

(22) Filed: Feb. 28, 2025

(65) Prior Publication Data

US 2025/0199219 A1 Jun. 19, 2025

Related U.S. Application Data

(63) Continuation of application No. PCT/JP2023/030936, filed on Aug. 28, 2023.

(30) Foreign Application Priority Data

Aug. 31, 2022 (JP) ................ 2022-138361

(51) Int. Cl.
G02B 5/28 (2006.01)
G02B 5/22 (2006.01)

(52) U.S. Cl.
CPC ............ G02B 5/282 (2013.01); G02B 5/223 (2013.01)

(58) Field of Classification Search
CPC .......... G02B 5/208; G02B 1/04; G02B 5/223; G02B 5/282; G02B 5/22; G02B 5/28;
(Continued)

(56) References Cited

U.S. PATENT DOCUMENTS 10,408,981 B2 * 9/2019 Yoshihara .............. G03B 11/00
11,993,718 B2 * 5/2024 Suzuki .................. G02B 5/208
(Continued)

FOREIGN PATENT DOCUMENTS

JP 2020-109496 7/2020
JP 6724329 7/2020
(Continued)

OTHER PUBLICATIONS

Examiner provided machine translation of Tatemura, WO 2019189039 A1 (Year: 2019).*

(Continued)

*Primary Examiner* — Balram T Parbadia
(74) *Attorney, Agent, or Firm* — Oblon, McClelland, Maier & Neustadt, L.L.P.

(57) ABSTRACT

An optical filter includes a first dielectric multilayer film, a resin film, a phosphate glass, and a second dielectric multilayer film. The second dielectric multilayer film includes at least one $H_2$ layer satisfying a refractive index of 1.8 or more and 2.5 or less and a QWOT of 1.1 or more and 3.5 or less, when a layer closest to the phosphate glass in the $H_2$ layers is defined as a first $H_2$ layer, the second dielectric multilayer film comprises a first $M_2$ layer comprising a single layer satisfying a QWOT of 1.2 or more and 1.8 or less or a plurality of layers satisfying a total QWOT of 1.2 or more and 1.8 or less between the first $H_2$ layer and the phosphate glass, and the optical filter satisfies all of the spectral characteristics (i-1) to (i-4).

27 Claims, 8 Drawing Sheets

(58) Field of Classification Search
CPC . G02B 5/26; G02B 5/283; G02B 5/20; G02B 5/201; G02B 5/281
See application file for complete search history.

(56) References Cited

U.S. PATENT DOCUMENTS

| | | | | |
|---|---|---|---|---|
| 2010/0330378 | A1* | 12/2010 | Takahashi | G02B 1/113 427/166 |
| 2015/0146057 | A1* | 5/2015 | Konishi | C03C 4/082 359/359 |
| 2015/0285971 | A1 | 10/2015 | Nagaya et al. | |
| 2015/0293284 | A1* | 10/2015 | Tatemura | H10F 39/806 359/359 |
| 2017/0017023 | A1* | 1/2017 | Sugiyama | H10F 39/806 |
| 2017/0017024 | A1* | 1/2017 | Hasegawa | C07D 209/08 |
| 2020/0241185 | A1* | 7/2020 | Choi | C08K 5/3417 |
| 2021/0165145 | A1* | 6/2021 | Yamazaki | G02B 5/223 |

FOREIGN PATENT DOCUMENTS

| | | |
|---|---|---|
| JP | 2020-122970 | 8/2020 |
| TW | 201329530 A | 7/2013 |
| WO | WO 2014/002864 A1 | 1/2014 |
| WO | WO2014/034386 | 3/2014 |
| WO | WO 2018/043564 A1 | 3/2018 |
| WO | WO2019/189039 | 10/2019 |

OTHER PUBLICATIONS

International Search Report issued on Nov. 7, 2023 in PCT/JP2023/030936 filed on Aug. 28, 2023 (with English Translation).
Written Opinion of the International Search Authority issued on Nov. 7, 2023 in PCT/JP2023/030936 filed on Aug. 28, 2023 (with English Translation).
Notice for Reasons of Refusal in corresponding JP 2024544236 dated Oct. 8, 2024 (English translation included).
Decision to Grant a Patent in corresponding JP 2024544236 dated Nov. 5, 2024 (English translation included).

* cited by examiner

FIG. 1

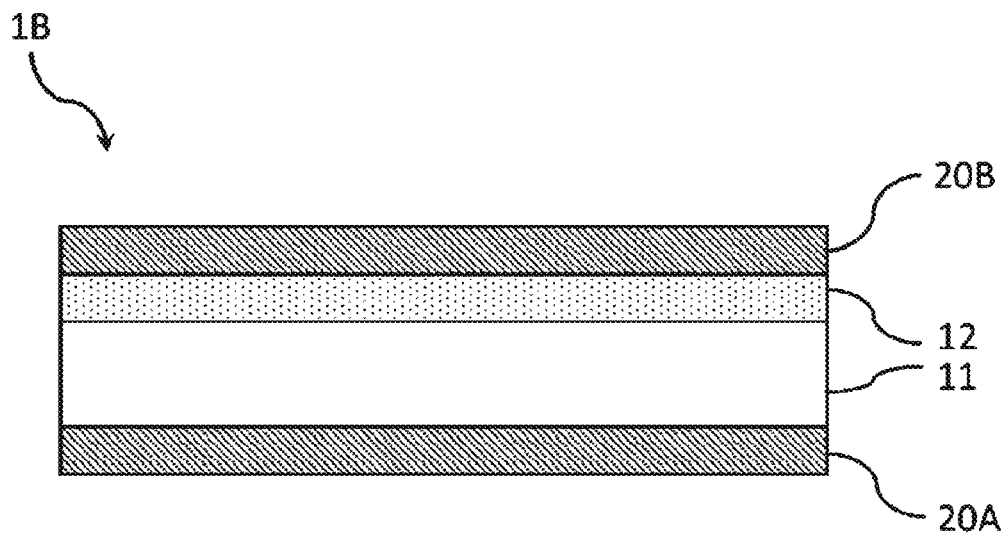

FIG. 2

| Layer configuration | Material | Physical film thickness[nm] | QWOT | H layer/M layer | |
|---|---|---|---|---|---|
| 8th layer | SiO$_2$ | 108.01 | 1.282 | | 20B |
| 7th layer | TiO$_2$ | 29.93 | 0.591 | | |
| 6th layer | SiO$_2$ | 17.81 | 0.211 | | |
| 5th layer | TiO$_2$ | 79.5 | 1.569 | First H$_1$ layer | |
| 4th layer | SiO$_2$ | 20.07 | 0.238 | First M$_1$ layer (QWOT:1.662) | |
| 3rd layer | TiO$_2$ | 31.42 | 0.620 | | |
| 2nd layer | SiO$_2$ | 49.92 | 0.592 | | |
| 1st layer | TiO$_2$ | 10.69 | 0.211 | | |
| 1st layer | TiO$_2$ | 10.69 | 0.211 | | 20A |
| 2nd layer | SiO$_2$ | 49.92 | 0.592 | First M$_2$ layer (QWOT:1.662) | |
| 3rd layer | TiO$_2$ | 31.42 | 0.620 | | |
| 4th layer | SiO$_2$ | 20.07 | 0.238 | | |
| 5th layer | TiO$_2$ | 79.5 | 1.569 | First H$_2$ layer | |
| 6th layer | SiO$_2$ | 17.81 | 0.211 | | |
| 7th layer | TiO$_2$ | 29.93 | 0.591 | | |
| 8th layer | SiO$_2$ | 108.01 | 1.282 | | |

FIG. 3

| Layer configuration | Material | Physical film thickness[nm] | QWOT | H layer/M layer | |
|---|---|---|---|---|---|
| 12th layer | SiO₂ | 110.1 | 1.3064 | | |
| 11th layer | TiO₂ | 29.73 | 0.5868 | | |
| 10th layer | SiO₂ | 18.95 | 0.2248 | | |
| 9th layer | TiO₂ | 88.78 | 1.7523 | Second H₁ layer | |
| 8th layer | SiO₂ | 7.16 | 0.0850 | Second M₁ layer (QWOT:1.288) | 20B |
| 7th layer | TiO₂ | 54.97 | 1.0850 | | |
| 6th layer | SiO₂ | 9.95 | 0.1181 | | |
| 5th layer | TiO₂ | 161.36 | 3.1849 | First H₁ layer | |
| 4th layer | SiO₂ | 22.4 | 0.2658 | First M₁ layer (QWOT:1.670) | |
| 3rd layer | TiO₂ | 29.42 | 0.5807 | | |
| 2nd layer | SiO₂ | 52.25 | 0.6200 | | |
| 1st layer | TiO₂ | 10.3 | 0.2033 | | |

— 12
— 11

| Layer configuration | Material | Physical film thickness[nm] | QWOT | H layer/M layer | |
|---|---|---|---|---|---|
| 1st layer | TiO₂ | 10.3 | 0.2033 | | |
| 2nd layer | SiO₂ | 52.25 | 0.6200 | First M₂ layer (QWOT:1.670) | |
| 3rd layer | TiO₂ | 29.42 | 0.5807 | | |
| 4th layer | SiO₂ | 22.4 | 0.2658 | | |
| 5th layer | TiO₂ | 161.36 | 3.1849 | First H₂ layer | |
| 6th layer | SiO₂ | 9.95 | 0.1181 | Second M₂ layer (QWOT:1.288) | 20A |
| 7th layer | TiO₂ | 54.97 | 1.0850 | | |
| 8th layer | SiO₂ | 7.16 | 0.0850 | | |
| 9th layer | TiO₂ | 88.78 | 1.7523 | Second H₂ layer | |
| 10th layer | SiO₂ | 18.95 | 0.2248 | | |
| 11th layer | TiO₂ | 29.73 | 0.5868 | | |
| 12th layer | SiO₂ | 110.1 | 1.3064 | | |

FIG. 4

| Layer configuration | Material | Physical film thickness[nm] | QWOT | H layer/M layer | |
|---|---|---|---|---|---|
| 21st layer | MgF$_2$ | 121.91 | 1.346 | | |
| 20th layer | TiO$_2$ | 25.37 | 0.501 | | |
| 19th layer | SiO$_2$ | 23.82 | 0.283 | | |
| 18th layer | TiO$_2$ | 87.69 | 1.731 | Second H$_1$ layer | |
| 17th layer | SiO$_2$ | 21.2 | 0.252 | | |
| 16th layer | TiO$_2$ | 32.16 | 0.635 | Second M$_1$ layer (QWOT:2.030) | |
| 15th layer | SiO$_2$ | 66.91 | 0.794 | | |
| 14th layer | TiO$_2$ | 17.7 | 0.349 | | |
| 13th layer | SiO$_2$ | 70.3 | 0.834 | | |
| 12th layer | TiO$_2$ | 27.95 | 0.552 | Third M$_1$ layer (QWOT:1.674) | |
| 11th layer | SiO$_2$ | 24.32 | 0.289 | | 20B |
| 10th layer | TiO$_2$ | 117.33 | 2.316 | First H$_1$ layer | |
| 9th layer | SiO$_2$ | 14.56 | 0.173 | | |
| 8th layer | TiO$_2$ | 25.32 | 0.500 | | |
| 7th layer | SiO$_2$ | 23.17 | 0.275 | First M$_1$ layer (QWOT:1.773) | |
| 6th layer | TiO$_2$ | 8.25 | 0.163 | | |
| 5th layer | SiO$_2$ | 40.08 | 0.476 | | |
| 4th layer | TiO$_2$ | 9.49 | 0.187 | | |
| 3rd layer | SiO$_2$ | 99.25 | 1.178 | | |
| 2nd layer | TiO$_2$ | 4.9 | 0.097 | | |
| 1st layer | MgF$_2$ | 34.94 | 0.386 | | |

— 12
— 11

| Layer configuration | Material | Physical film thickness[nm] | QWOT | H layer/M layer | |
|---|---|---|---|---|---|
| 1st layer | MgF$_2$ | 34.94 | 0.386 | | |
| 2nd layer | TiO$_2$ | 4.9 | 0.097 | | |
| 3rd layer | SiO$_2$ | 99.25 | 1.178 | | |
| 4th layer | TiO$_2$ | 9.49 | 0.187 | | |
| 5th layer | SiO$_2$ | 40.08 | 0.476 | | |
| 6th layer | TiO$_2$ | 8.25 | 0.163 | First M$_2$ layer (QWOT:1.773) | |
| 7th layer | SiO$_2$ | 23.17 | 0.275 | | |
| 8th layer | TiO$_2$ | 25.32 | 0.500 | | |
| 9th layer | SiO$_2$ | 14.56 | 0.173 | | |
| 10th layer | TiO$_2$ | 117.33 | 2.316 | First H$_2$ layer | |
| 11th layer | SiO$_2$ | 24.32 | 0.289 | | |
| 12th layer | TiO$_2$ | 27.95 | 0.552 | Third M$_2$ layer (QWOT:1.674) | 20A |
| 13th layer | SiO$_2$ | 70.3 | 0.834 | | |
| 14th layer | TiO$_2$ | 17.7 | 0.349 | | |
| 15th layer | SiO$_2$ | 66.91 | 0.794 | Second M$_2$ layer (QWOT:2.030) | |
| 16th layer | TiO$_2$ | 32.16 | 0.635 | | |
| 17th layer | SiO$_2$ | 21.2 | 0.252 | | |
| 18th layer | TiO$_2$ | 87.69 | 1.731 | Second H$_2$ layer | |
| 19th layer | SiO$_2$ | 23.82 | 0.283 | | |
| 20th layer | TiO$_2$ | 25.37 | 0.501 | | |
| 21st layer | MgF$_2$ | 121.91 | 1.346 | | |

OPTICAL FILTER

CROSS-REFERENCE TO RELATED APPLICATIONS

This is a bypass continuation of International Application No. PCT/JP2023/030936 filed on Aug. 28, 2023, and claims priority from Japanese Patent Application No. 2022-138361 filed on Aug. 31, 2022, the entire content of which is incorporated herein by reference.

TECHNICAL FIELD

The present invention relates to an optical filter that transmits visible light and shields near-infrared light.

BACKGROUND ART

In an imaging device including a solid state image sensor, in order to satisfactorily reproduce a color tone and obtain a clear image, an optical filter that transmits light in a visible region (hereinafter, also referred to as "visible light") and shields light in a near-infrared wavelength region (hereinafter, also referred to as "near-infrared light") is used.

Examples of such an optical filter include various types such as a reflection type filter in which dielectric thin films having different refractive indices are alternately laminated on one surface or both surfaces of a transparent substrate (dielectric multilayer film), and light desired to be shielded is reflected using interference of light.

Patent Literatures 1 and 2 disclose an optical filter including a dielectric multilayer film and an absorbing layer containing a dye.

CITATION LIST

Patent Literature

Patent Literature 1: WO2014/002864
Patent Literature 2: WO2018/043564

SUMMARY OF INVENTION

Technical Problem

In an optical filter including a dielectric multilayer film, since an optical film thickness of the dielectric multilayer film changes depending on an incident angle of light, there is a problem that a spectral transmittance curve and a spectral reflectance curve change depending on the incident angle. For example, according to the number of laminated layers of the multilayer film, a large change in transmittance in a visible light region due to interference caused by reflected light at interfaces of respective layers, that is, a ripple is generated, and the larger the incident angle of light is, the stronger the generation of the ripple is. This causes a problem that a captured amount of light in a visible light region changes at a high incident angle and image reproducibility is reduced. In particular, with a reduction in height of camera modules in recent years, use under a condition of a high incident angle is assumed, and therefore an optical filter that is less likely to be affected by an incident angle is required.

In an optical filter using reflection of a dielectric multilayer film in the related art, reflected light is re-reflected by a lens surface and is incident, or light reflected by a sensor surface is re-reflected by a dielectric multilayer film surface and is incident, resulting in a phenomenon in which light is generated outside an originally assumed optical path, that is, so-called stray light, may be generated. When such a filter is used, flare or ghost may occur in a solid state image sensor, or image quality reduction may occur. In particular, with image quality enhancement of camera modules in recent years, an optical filter in which stray light is less likely to be generated is required.

An object of the present invention is to provide an optical filter in which a ripple and stray light in a visible light region are prevented, and a transmittance in the visible light region and shielding properties in a near-infrared light region are excellent.

Solution to Problem

The present invention provides an optical filter having the following configuration.

[1] An optical filter including a first dielectric multilayer film, a resin film, a phosphate glass, and a second dielectric multilayer film in this order,
in which the resin film includes a resin and a dye having a maximum absorption wavelength in 690 nm to 800 nm in the resin,
the first dielectric multilayer film and the second dielectric multilayer film each includes a plurality of layers having different refractive indices,
the second dielectric multilayer film includes at least one $H_2$ layer satisfying a refractive index of 1.8 or more and 2.5 or less and a QWOT of 1.1 or more and 3.5 or less, and
when a layer closest to the phosphate glass in the $H_2$ layers is defined as a first $H_2$ layer, the second dielectric multilayer film includes a first $M_2$ layer including a single layer satisfying a QWOT of 1.2 or more and 1.8 or less or a plurality of layers satisfying a total QWOT of 1.2 or more and 1.8 or less between the first $H_2$ layer and the phosphate glass, and
the optical filter satisfies all of the following spectral characteristics (i-1) to (i-4):
(i-1) in a spectral transmittance curve at an incident angle of 0 degrees, an average transmittance $T_{450-550(0deg)AVE}$ at a wavelength of 450 nm to 550 nm is 85% or more
(i-2) in a spectral transmittance curve at an incident angle of 50 degrees, an average transmittance $T_{450-550(50deg)AVE}$ at a wavelength of 450 nm to 550 nm is 85% or more
(i-3) in a spectral transmittance curve at an incident angle of 0 degrees, an average transmittance $T_{750-1000(0deg)AVE}$ at a wavelength of 750 nm to 1,000 nm is 2.5% or less
(i-4) in a spectral transmittance curve at an incident angle of 50 degrees, an average transmittance $T_{750-1000(50deg)AVE}$ at a wavelength of 750 nm to 1,000 nm is 2.5% or less.

[2] An optical filter including a first dielectric multilayer film, a resin film, a phosphate glass, and a second dielectric multilayer film in this order,
in which the resin film includes a resin and a dye having a maximum absorption wavelength in 690 nm to 800 nm in the resin,
the first dielectric multilayer film and the second dielectric multilayer film each includes a plurality of layers having different refractive indices, the first dielectric multilayer film includes at least one $H_1$ layer satisfying a refractive index of 1.8 or more and 2.5 or less and a QWOT of 1.1 or more and 3.5 or less, and when a layer closest to the resin film in the $H_1$ layers is defined as a first $H_1$ layer, the first dielectric multilayer film includes a first $M_1$ layer including a single layer satisfying a QWOT of 1.2 or more and 1.8 or less or a plurality of layers satisfying a total QWOT of 1.2 or more and 1.8 or less between the first $H_1$ layer and the resin film, and the optical filter satisfies all of the following spectral characteristics (i-1) to (i-4):

(i-1) in a spectral transmittance curve at an incident angle of 0 degrees, an average transmittance $T_{450-550(0deg)AVE}$ at a wavelength of 450 nm to 550 nm is 85% or more (i-2) in a spectral transmittance curve at an incident angle of 50 degrees, an average transmittance $T_{450-550(50deg)AVE}$ at a wavelength of 450 nm to 550 nm is 85% or more (i-3) in a spectral transmittance curve at an incident angle of 0 degrees, an average transmittance $T_{750-1000(0deg)AVE}$ at a wavelength of 750 nm to 1,000 nm is 2.5% or less (i-4) in a spectral transmittance curve at an incident angle of 50 degrees, an average transmittance $T_{750-1000(50deg)AVE}$ at a wavelength of 750 nm to 1,000 nm is 2.5% or less.

Advantageous Effects of Invention

According to the present invention, it is possible to provide an optical filter in which a ripple and stray light in a visible light region are prevented, and a transmittance in the visible light region and shielding properties in a near-infrared light region are excellent.

BRIEF DESCRIPTION OF DRAWINGS

FIG. 1 is a cross-sectional view schematically illustrating an example of the optical filter according to one embodiment.

FIG. 2 is a schematic cross-sectional view illustrating a configuration of an optical filter of Example 2-1.

FIG. 3 is a schematic cross-sectional view illustrating a configuration of an optical filter of Example 2-2.

FIG. 4 is a schematic cross-sectional view illustrating a configuration of an optical filter of Example 2-3.

DESCRIPTION OF EMBODIMENTS

Figure 5:
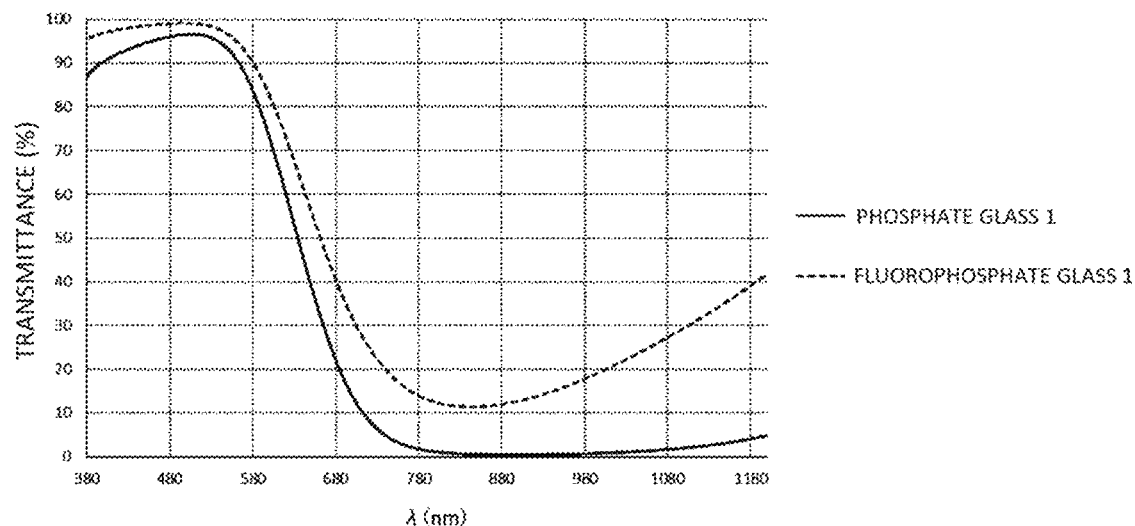
FIG. 5 is a diagram illustrating spectral transmittance curves of glass.
Figure 6:
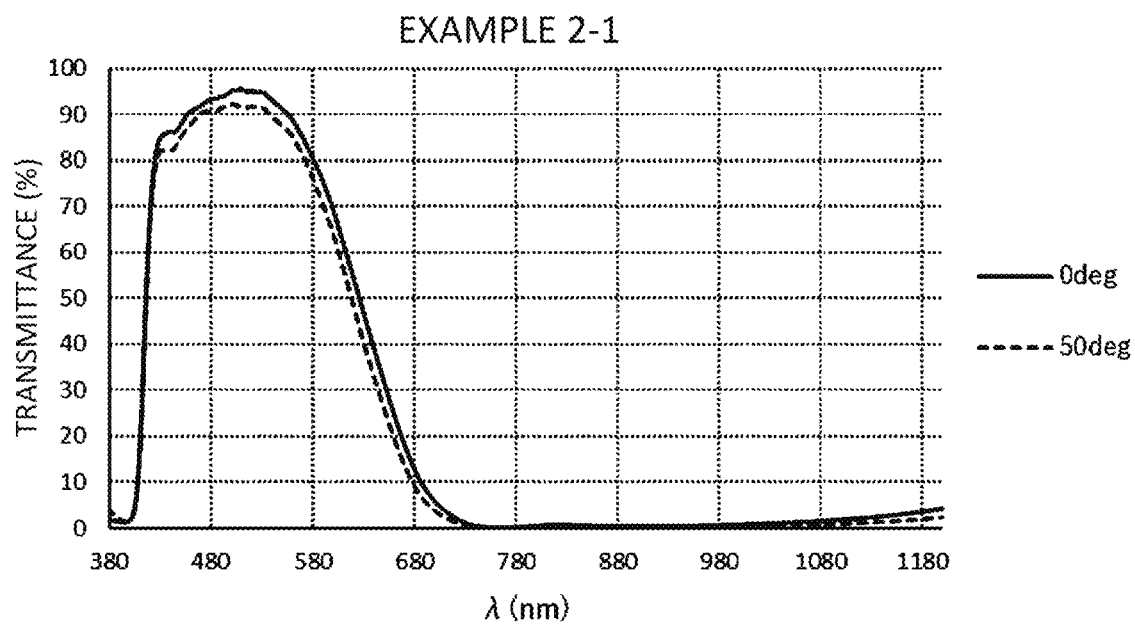
FIG. 6 is a diagram illustrating spectral transmittance curves of the optical filter of Example 2-1.
Figure 7:
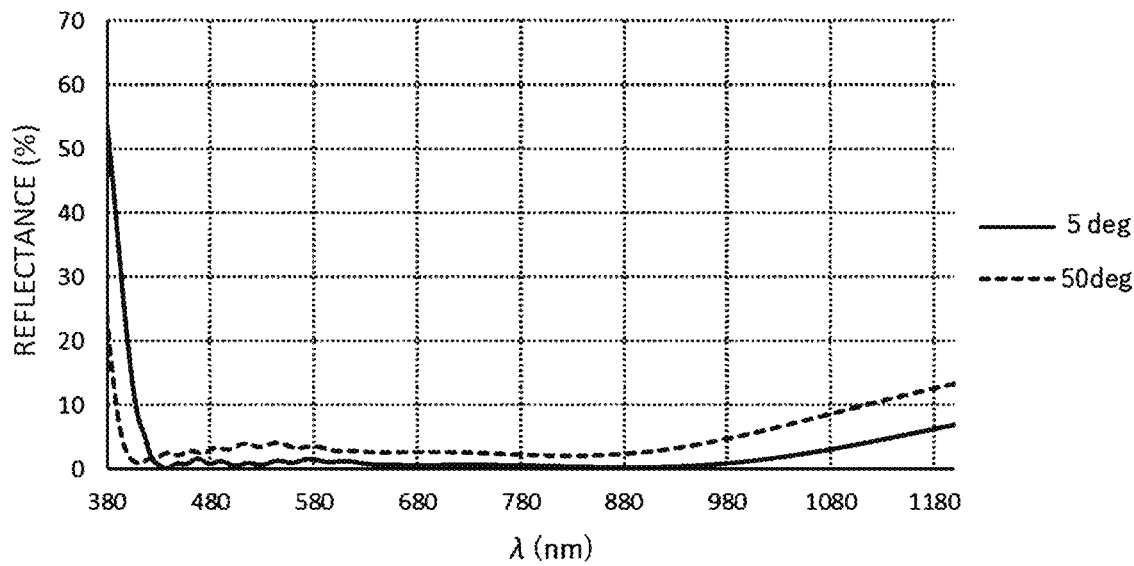
FIG. 7 is a diagram illustrating spectral reflectance curves of the optical filter of Example 2-1.
Figure 8:
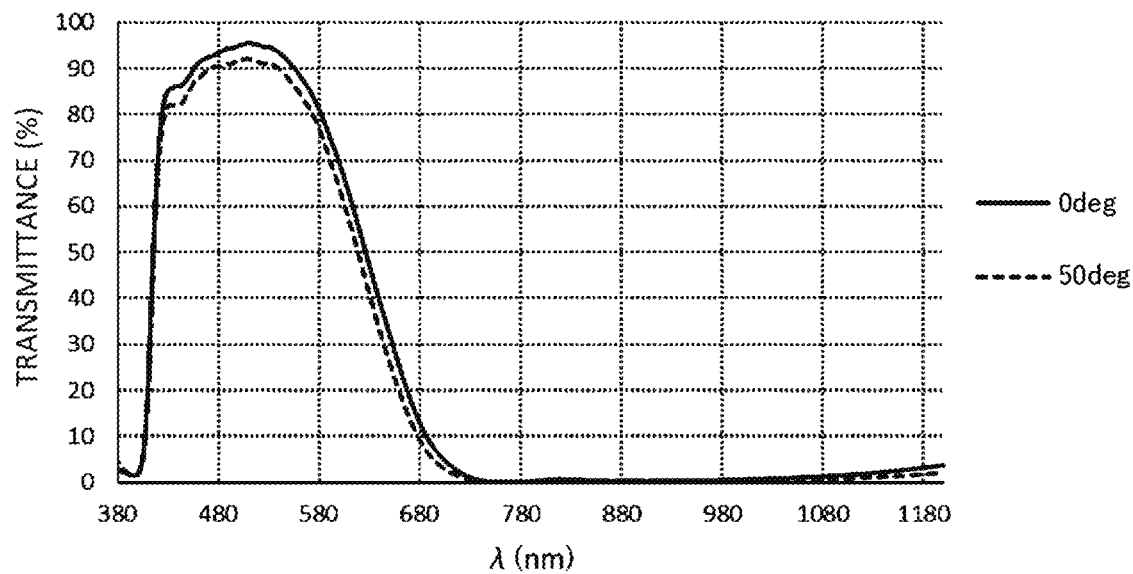
FIG. 8 is a diagram illustrating spectral transmittance curves of an optical filter of Example 2-4.
Figure 9:
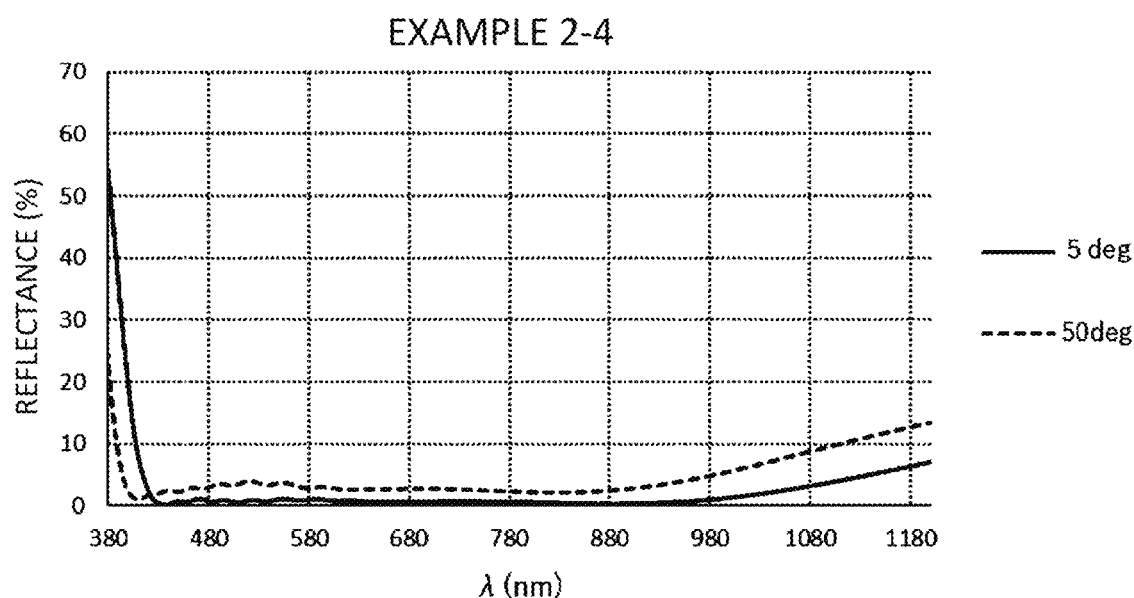
FIG. 9 is a diagram illustrating spectral reflectance curves of the optical filter of Example 2-4.
Figure 10:
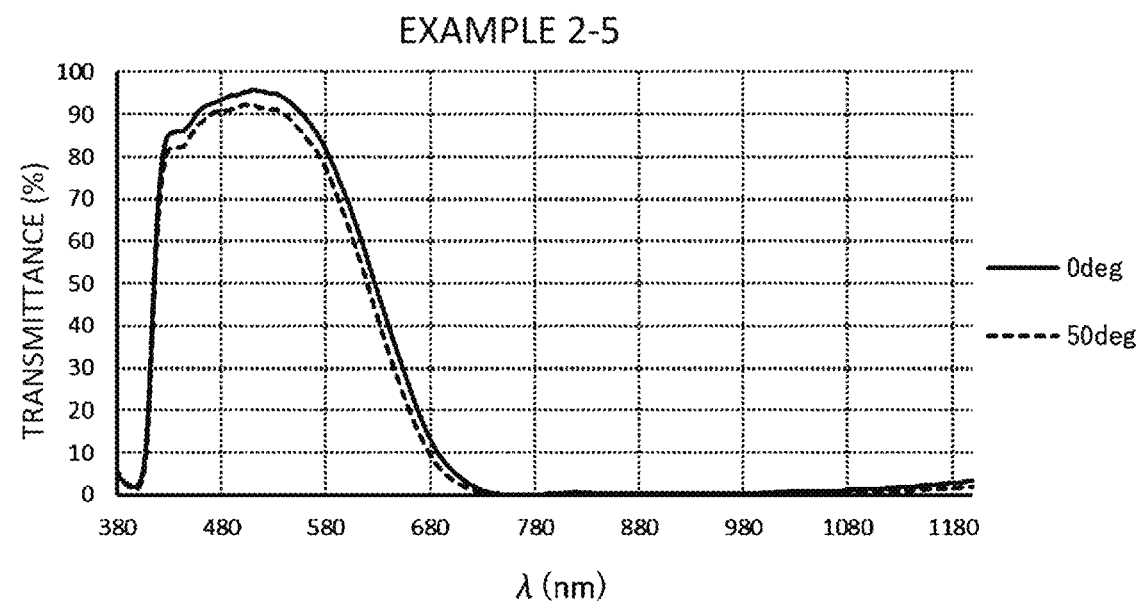
FIG. 10 is a diagram illustrating spectral transmittance curves of an optical filter of Example 2-5.
Figure 11:
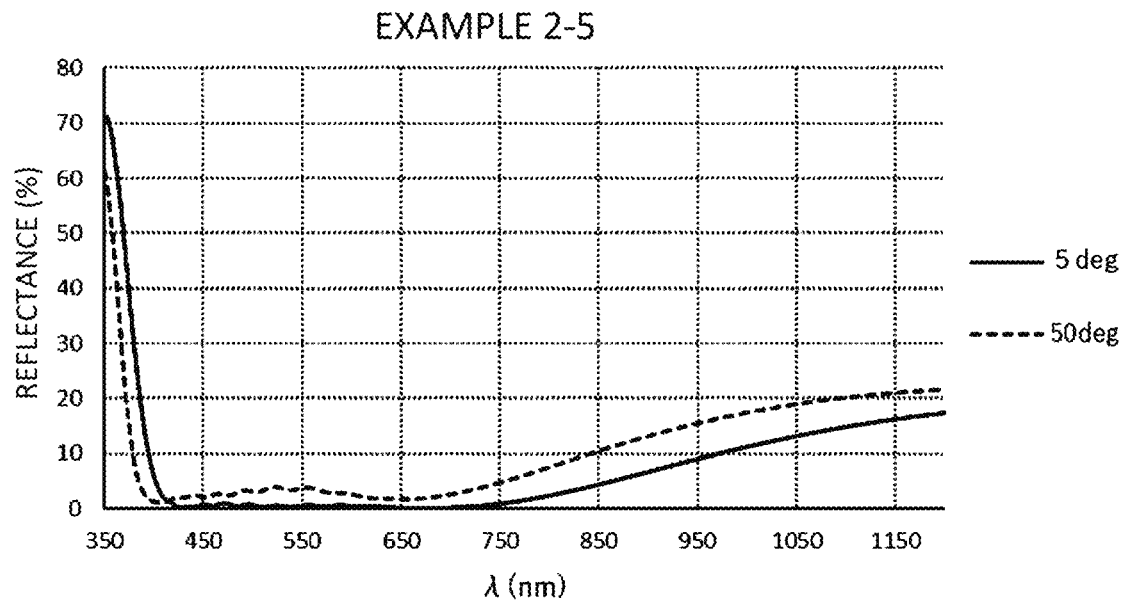
FIG. 11 is a diagram illustrating spectral reflectance curves of the optical filter of Example 2-5.
Figure 12:
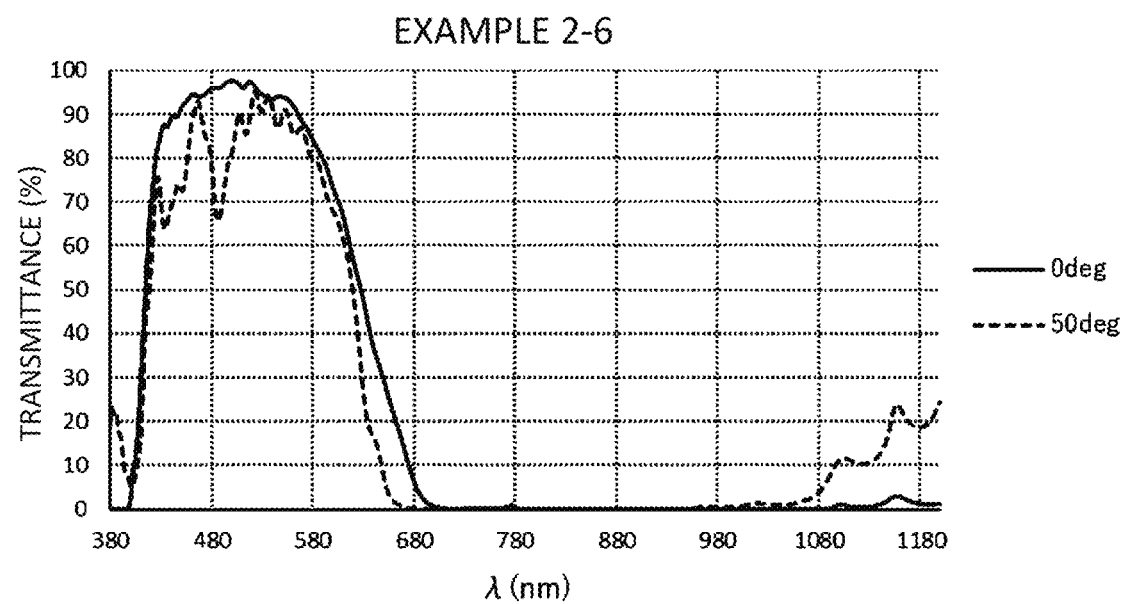
FIG. 12 is a diagram illustrating spectral transmittance curves of an optical filter of Example 2-6.
Figure 13:
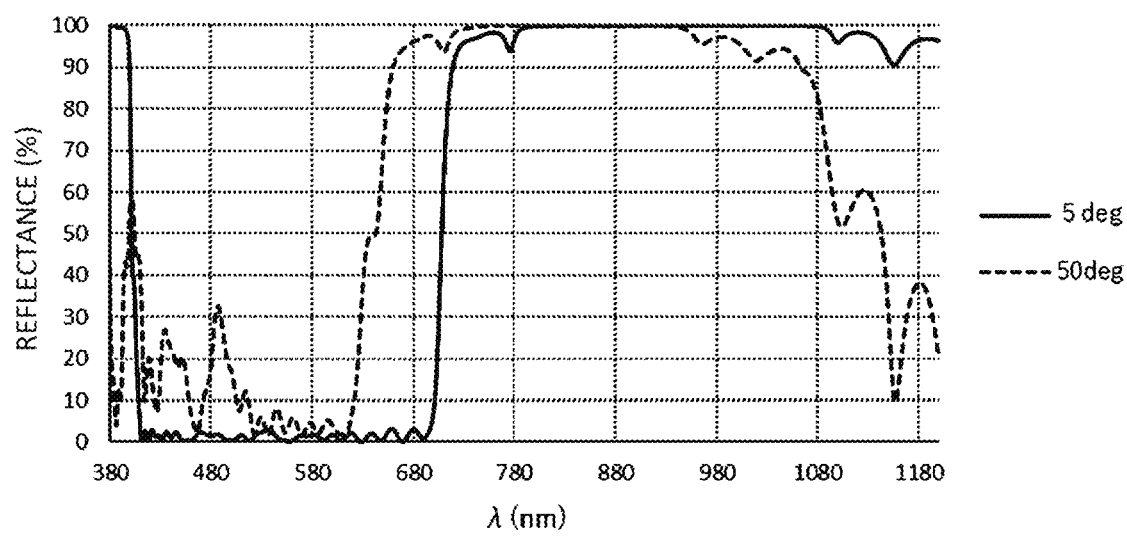
FIG. 13 is a diagram illustrating spectral reflectance curves of the optical filter of Example 2-6.

Hereinafter, embodiments of the present invention are described.

In the present description, a near-infrared ray absorbing dye may be abbreviated as an "NIR dye", and an ultraviolet absorbing dye may be abbreviated as a "UV dye".

In the present description, a compound represented by a formula (I) is referred to as a compound (I). The same applies to compounds represented by other formulae. A dye composed of the compound (I) is also referred to as a dye (I), and the same applies to other dyes.

In the present description, an internal transmittance is a transmittance obtained by subtracting an influence of interface reflection from a measured transmittance, which is represented by a formula of {measured transmittance (incident angle of 0 degrees)/(100−reflectance (incident angle of 5 degrees))}×100.

In the present description, spectra of a transmittance of a substrate and a transmittance of a resin film including a case where a dye is contained in a resin are all "internal transmittance" even when described as a "transmittance". On the other hand, a transmittance measured by dissolving a dye in a solvent such as dichloromethane, a transmittance of a dielectric multilayer film, and a transmittance of an optical filter including the dielectric multilayer film are measured transmittances.

In the present description, a transmittance of, for example, 90% or more in a specific wavelength region means that the transmittance does not fall below 90% in the entire wavelength region, that is, a minimum transmittance in the wavelength region is 90% or more. Similarly, a transmittance of, for example, 1% or less in a specific wavelength region means that the transmittance does not exceed 1% in the entire wavelength region, that is, a maximum transmittance in the wavelength region is 1% or less. The same applies to the internal transmittance. An average transmittance and an average internal transmittance in the specific wavelength region are the arithmetic mean of a transmittance and an internal transmittance per 1 nm in the wavelength region.

Spectral characteristics can be measured by using an ultraviolet-visible spectrophotometer.

In the present description, the word "to" that is used to express a numerical range includes upper and lower limits of the range.

<Optical Filter>

FIG. 1 is a cross-sectional view illustrating an optical filter (hereinafter, also referred to as "the filter") according to one embodiment of the present invention. The filter 1B includes a first dielectric multilayer film 20B, a resin film 12, a phosphate glass 11, and a second dielectric multilayer film 20A in this order. Here, the resin film includes a resin and a dye having a maximum absorption wavelength in 690 nm to 800 nm in the resin.

In the present invention, at least one of the first dielectric multilayer film and the second dielectric multilayer film has small reflection characteristics even at a high incident angle as described later, and thus stray light can be prevented. In addition, light-shielding properties of the optical filter are substantially ensured by absorption characteristics of the phosphate glass. Since the absorption characteristics are not affected by the incident angle of light, the optical filter as a whole can achieve an excellent transmittance in the visible light region and excellent shielding properties in the near-infrared light region while preventing a ripple in the visible light region.

<Characteristics of Optical Filter>

The optical filter according to the present invention satisfies all of the following spectral characteristics (i-1) to (i-4).

(i-1) In a spectral transmittance curve at an incident angle of 0 degrees, an average transmittance $T_{450-550(0deg)AVE}$ at a wavelength of 450 nm to 550 nm is 85% or more.

(i-2) In a spectral transmittance curve at an incident angle of 50 degrees, an average transmittance $T_{450-550(50deg)AVE}$ at a wavelength of 450 nm to 550 nm is 85% or more.

(i-3) In a spectral transmittance curve at an incident angle of 0 degrees, an average transmittance $T_{750-1000(0deg)AVE}$ at a wavelength of 750 nm to 1,000 nm is 2.5% or less.

(i-4) In a spectral transmittance curve at an incident angle of 50 degrees, an average transmittance $T_{750-1000(50deg)AVE}$ at a wavelength of 750 nm to 1,000 nm is 2.5% or less.

The filter satisfying all of the spectral characteristics (i-1) to (i-4) has a high transmittance in a visible light region as shown in the characteristic (i-1) and high shielding properties in a near-infrared light region as shown in the characteristic (i-3). Further, the filter has a small change in spectral characteristic at a high incident angle and prevents a ripple in the visible light region as shown in the characteristics (i-2) to (i-4).

Satisfying the spectral characteristics (i-1) and (i-2) means that the transmittance in a visible light region of 450 nm to 550 nm is excellent even at a high incident angle.

The average transmittance $T_{450-550(0deg)AVE}$ is preferably 88% or more, and more preferably 91% or more.

The average transmittance $T_{450-550(50deg)AVE}$ is preferably 87% or more, and more preferably 89% or more.

Satisfying the spectral characteristics (i-3) and (i-4) means that shielding properties in the near-infrared light region of 750 nm to 1,000 nm are excellent even at a high incident angle.

The average transmittance $T_{750-1000(0deg)AVE}$ is preferably 1.5% or less, and more preferably 1% or less.

The average transmittance $T_{750-1000(50deg)AVE}$ is preferably 1% or less, and more preferably 0.5% or less.

The optical filter according to the present invention preferably further satisfies the following spectral characteristics (i-5) to (i-8).

(i-5) When a second dielectric multilayer film side is set as an incident direction, an average reflectance $R2_{750-1000(5deg)AVE}$ at a wavelength of 750 nm to 1,000 nm in a spectral reflectance curve at an incident angle of 5 degrees is 3% or less.

(i-6) When a second dielectric multilayer film side is set as an incident direction, an average reflectance $R2_{450-600(5deg)AVE}$ at a wavelength of 450 nm to 600 nm in a spectral reflectance curve at an incident angle of 5 degrees is 3% or less.

(i-7) When a second dielectric multilayer film side is set as an incident direction, an average reflectance $R2_{750-1000(50deg)AVE}$ at a wavelength of 750 nm to 1,000 nm in a spectral reflectance curve at an incident angle of 50 degrees is 5% or less.

(i-8) When a second dielectric multilayer film side is set as an incident direction, an average reflectance $R2_{450-600(50deg)AVE}$ at a wavelength of 450 nm to 600 nm in a spectral reflectance curve at an incident angle of 50 degrees is 5% or less.

The spectral characteristics (i-5) and (i-6) define reflection characteristics on the second dielectric multilayer film side, and the spectral characteristics (i-7) and (i-8) define reflection characteristics on the second dielectric multilayer film side at a high incident angle.

Since the reflectance in the visible light region and the near-infrared light region is small even at a high incident angle, reflection on a second dielectric multilayer film surface that causes stray light can be prevented.

The average reflectance $R2_{750-1000(5deg)AVE}$ is more preferably 1.5% or less, and further preferably 1% or less.

The average reflectance $R2_{450-600(5deg)AVE}$ is more preferably 1.5% or less, and further preferably 1% or less.

The average reflectance $R2_{750-1000(50deg)AVE}$ is more preferably 3% or less, and further preferably 2% or less.

The average reflectance $R2_{450-600(50deg)AVE}$ is more preferably 4% or less, and further preferably 3% or less.

The optical filter according to the present invention preferably further satisfies the following spectral characteristics (i-9) to (i-12).

(i-9) In a spectral transmittance curve at an incident angle of 0 degrees, an average transmittance $T_{1000-1200(0deg)AVE}$ at a wavelength of 1,000 nm to 1,200 nm is 7% or less.

(i-10) In a spectral transmittance curve at an incident angle of 50 degrees, an average transmittance $T_{1000-1200(50deg)AVE}$ at a wavelength of 1,000 nm to 1,200 nm is 7% or less.

(i-11) In a spectral transmittance curve at an incident angle of 0 degrees, a wavelength $IR30_{(0deg)}$ at which a transmittance is 30% is in a wavelength range of 630 nm to 680 nm.

(i-12) In a spectral transmittance curve at an incident angle of 50 degrees, a wavelength $IR30_{(50deg)}$ at which a transmittance is 30% is in a wavelength range of 630 nm to 680 nm.

Satisfying the spectral characteristics (i-9) and (i-10) means that light-shielding properties in the near-infrared light region of 1,000 nm to 1,200 nm is excellent even at a high incident angle.

The average transmittance $T_{1000-1200(0deg)AVE}$ is more preferably 5% or less, and further preferably 3% or less.

The average transmittance $T_{1000-1200(50deg)AVE}$ is more preferably 3% or less, and further preferably 2% or less.

Satisfying the spectral characteristics (i-11) and (i-12) means that light in the near-infrared light region is shielded and visible transmitted light is efficiently taken in even at a high incident angle.

The wavelength $IR30_{(0deg)}$ is more preferably in a range of 640 nm to 675 nm, and further preferably in a range of 640 nm to 670 nm.

The wavelength $IR30_{(50deg)}$ is more preferably in a range of 640 nm to 675 nm, and further preferably in a range of 640 nm to 670 nm.

The optical filter according to the present invention preferably further satisfies the following spectral characteristics (i-13) to (i-16).

(i-13) When a first dielectric multilayer film side is set as an incident direction, an average reflectance $R1_{750-1000(5deg)AVE}$ at a wavelength of 750 nm to 1,000 nm in a spectral reflectance curve at an incident angle of 5 degrees is 3% or less.

(i-14) When a first dielectric multilayer film side is set as an incident direction, an average reflectance $R1_{450-600(5deg)AVE}$ at a wavelength of 450 nm to 600 nm in a spectral reflectance curve at an incident angle of 5 degrees is 3% or less.

(i-15) When a first dielectric multilayer film side is set as an incident direction, an average reflectance $R1_{750-1000(50deg)AVE}$ at a wavelength of 750 nm to 1,000 nm in a spectral reflectance curve at an incident angle of 50 degrees is 5% or less.

(i-16) When a first dielectric multilayer film side is set as an incident direction, an average reflectance $R1_{450-600(50deg)AVE}$ at a wavelength of 450 nm to 600 nm in a spectral reflectance curve at an incident angle of 50 degrees is 5% or less.

The spectral characteristics (i-13) and (i-14) define reflection characteristics on the first dielectric multilayer film side, and the spectral characteristics (i-15) and (i-16) define reflection characteristics on the first dielectric multilayer film side at a high incident angle.

Since the reflectance is small even at a high incident angle, reflection on a dielectric multilayer film surface that causes stray light can be prevented.

The average reflectance $R1_{750-1000(5deg)AVE}$ is more preferably 1.5% or less, and further preferably 1% or less.

The average reflectance $R1_{450-600(5deg)AVE}$ is more preferably 1.5% or less, and further preferably 1% or less.

The average reflectance $R1_{750-1000(50deg)AVE}$ is more preferably 3.5% or less, and further preferably 2% or less.

The average reflectance $R1_{450-600(50deg)AVE}$ is more preferably 4% or less, and further preferably 3.5% or less.

The optical filter according to the present invention preferably further satisfies the following spectral characteristics (i-17) to (i-20).

(i-17) An absolute value of a difference between the average transmittance $T_{450-550(0deg)AVE}$ and the average transmittance $T_{450-550(50deg)AVE}$ is 3.5% or less.

(i-18) An absolute value of a difference between the average transmittance $T_{750-1000(0deg)AVE}$ and the average transmittance $T_{750-1000(50deg)AVE}$ is 1.5% or less.

(i-19) An absolute value of a difference between the average transmittance $T_{1000-1200(0deg)AVE}$ and the average transmittance $T_{1000-1200(50deg)AVE}$ is 1.5% or less.

(i-20) An absolute value of a difference between the wavelength $IR30_{(0deg)}$ and the wavelength $IR30_{(50deg)}$ is 15 nm or less.

Satisfying the spectral characteristics (i-17) to (i-19) means that the transmittance in a visible light region of 450 nm to 600 nm and a near-infrared light region of 750 nm to 1,200 nm is less likely to change even at a high incident angle, that is, a ripple is prevented.

The absolute value in the spectral characteristic (i-17) is more preferably 3.2% or less, and further preferably 3% or less.

The absolute value in the spectral characteristic (i-18) is more preferably 1% or less, and further preferably 0.5% or less.

The absolute value of the spectral characteristic (i-19) is more preferably 1.3% or less, and further preferably 1.2% or less.

Satisfying the spectral characteristic (i-20) means that a spectral transmittance curve in a region of 630 nm to 680 nm is less likely to shift even at a high incident angle.

The absolute value in the spectral characteristic (i-20) is more preferably 10 nm or less, and further preferably 8 nm or less.

The optical filter according to the present invention preferably further satisfies the following spectral characteristic (i-21).

(i-21) When a second dielectric multilayer film side is set as an incident direction, an average of an absorption loss amount defined below in a wavelength range of 750 nm to 1,000 nm is 95% or more:

(absorption loss amount) [%]=100−(transmittance at incident angle of 5 degrees)−(reflectance at incident angle of 5 degrees).

Satisfying the spectral characteristic (i-21) means that both the transmittance in the visible light region and the shielding properties in the near-infrared light region are achieved.

The average of the absorption loss amount is more preferably 96% or more, and further preferably 97% or more.

The optical filter according to the present invention preferably further satisfies the following spectral characteristic (i-22).

(i-22) When a second dielectric multilayer film side is set as an incident direction, a minimum value of an absorption loss amount in a wavelength range of 750 nm to 1,000 nm is 90% or more.

Satisfying the spectral characteristic (i-22) means that both the transmittance in the visible light region and the shielding properties in the near-infrared light region are achieved.

The minimum value of the absorption loss amount is more preferably 92% or more, and further preferably 94% or more.

The optical filter according to the present invention preferably further satisfies the following spectral characteristic (i-23).

(i-23) When a second dielectric multilayer film side is set as an incident direction, when a reflectance $R2_{n(5deg)}$ (n: any integer) at each wavelength is read at an interval of 1 nm from a wavelength of 750 nm to a wavelength of 1,000 nm in a spectral reflectance curve at an incident angle of 5 degrees, the number of n at which the reflectance $R2_{n(5deg)}$ is 1% or less is 200 or more.

The spectral characteristic (i-23) defines the reflection characteristics on the second dielectric multilayer film side, and means that the reflection on the dielectric multilayer film surface that causes stray light can be prevented since the reflectance is small.

The number of n at which the reflectance $R2_{n(5deg)}$ is 1% or less is more preferably 220 or more, and further preferably 230 or more.

The optical filter according to the present invention preferably further satisfies the following spectral characteristic (i-24).

(i-24) When a first dielectric multilayer film side is set as the incident direction, when a reflectance $R1_{n(5deg)}$ (n: any integer) at each wavelength is read at an interval of 1 nm from a wavelength of 750 nm to a wavelength of 1,000 nm in a spectral reflectance curve at an incident angle of 5 degrees, the number of n at which the reflectance $R1_{n(5deg)}$ is 1% or less is 150 or more.

The spectral characteristic (i-24) defines the reflection characteristics on the first dielectric multilayer film side, and means that the reflection on the dielectric multilayer film surface that causes stray light can be prevented since the reflectance is small.

The number of n at which the reflectance $R1_{n(5deg)}$ is 1% or less is more preferably 180 or more, and further preferably 200 or more.

The optical filter according to the present invention preferably further satisfies the following spectral characteristics (i-25) to (i-28).

(i-25) In a spectral transmittance curve at an incident angle of 0 degrees, a minimum transmittance $T_{450-550(0deg)MIN}$ at a wavelength of 450 nm to 550 nm is 83% or more.

(i-26) In a spectral transmittance curve at an incident angle of 0 degrees, a maximum transmittance $T_{450-550(0deg)MAX}$ at a wavelength of 450 nm to 550 nm is 90% or more.

(i-27) In a spectral transmittance curve at an incident angle of 0 degrees, a maximum transmittance $T_{750-1000(0deg)MAX}$ at a wavelength of 750 nm to 1,000 nm is 1.2% or less.

(i-28) In a spectral transmittance curve at an incident angle of 0 degrees, a maximum transmittance $T_{1000-1200(0deg)MAX}$ at a wavelength of 1,000 nm to 1,200 nm is 7% or less.

Satisfying the characteristics (i-25) and (i-26) means that a transmittance of visible light is excellent, and satisfying the characteristics (i-27) and (i-28) means that shielding properties in a near-infrared region are excellent.

The minimum transmittance $T_{450-550(0deg)MIN}$ is more preferably 85% or more, and further preferably 87% or more.

The maximum transmittance $T_{450-550(0deg)MAX}$ is more preferably 92% or more, and further preferably 94% or more.

The maximum transmittance $T_{750-1000(0deg)MAX}$ is more preferably 1% or less, and further preferably 0.9% or less.

The maximum transmittance $T_{1000-1200(0deg)MAX}$ is more preferably 5% or less, and further preferably 4% or less.

<Second Dielectric Multilayer Film>

In the filter, the second dielectric multilayer film preferably prevents reflection in the visible light region and the near-infrared light region even at a high incident angle. In the present invention, since the second dielectric multilayer film prevents the reflection in the visible light region and the near-infrared light region, generation of a ripple in the visible light region is reduced, and spectral characteristics are less likely to change with respect to light at a high incident angle, thereby obtaining an optical filter in which stray light is prevented.

The second dielectric multilayer film is a multilayer film in which a plurality of layers having different refractive indices are included and these layers are alternately laminated. More specifically, examples of the layers include a dielectric layer having a low refractive index (low refractive index layer), a dielectric layer having a medium refractive index (medium refractive index layer), and a dielectric layer having a high refractive index (high refractive index layer), and the second dielectric multilayer film is a multilayer film in which two or more dielectric layers among those are alternately laminated.

A refractive index of the high refractive index layer at a wavelength of 500 nm is preferably 1.6 or more, and more preferably 2.2 to 2.5. Examples of a material of the high refractive index layer include $Ta_2O_5$, $TiO_2$, $TiO$, $Ti_2O_3$, and $Nb_2O_5$. Other commercially available products thereof include OS50 ($Ti_3O_5$), OS10 ($Ti_4O_7$), OA500 (mixture of $Ta_2O_5$ and $ZrO_2$), and OA600 (mixture of $Ta_2O_5$ and $TiO_2$) manufactured by Canon Optron, Inc. Among those, $TiO_2$ is preferable from the viewpoint of reproducibility in film formability and refractive index, stability, and the like.

A refractive index of the medium refractive index layer at the wavelength of 500 nm is preferably 1.6 or more and less than 2.2. Examples of a material of the medium refractive index layer include $ZrO_2$, $Nb_2O_5$, $Al_2O_3$, $HfO_2$, OM-4, OM-6, (mixtures of $Al_2O_3$ and $ZrO_2$), and OA-100 sold by Canon Optron, Inc., and $H_4$ and $M_2$ (alumina lanthania) sold by Merck KGaA. Among those, $Al_2O_3$-based compounds and mixtures of $Al_2O_3$ and $ZrO_2$ are preferable from the viewpoint of reproducibility in film formability and refractive index, stability, and the like.

A refractive index of the low refractive index layer at the wavelength of 500 nm is preferably less than 1.6, and more preferably 1.38 to 1.5. Examples of a material of the low refractive index layer include $SiO_2$, $SiO_xN_y$, and $MgF_2$. Other commercially available products thereof include S4F and S5F (mixtures of $SiO_2$ and $Al_2O_3$) manufactured by Canon Optron, Inc. Among those, $SiO_2$ is preferable from the viewpoint of reproducibility in film formability, stability, economic efficiency, and the like.

(Configuration of Second Dielectric Multilayer Film)

FIG. 2 is a schematic cross-sectional view illustrating a configuration of an optical filter prepared in Example 2-1 to be described later. In Example 2-1, the second dielectric multilayer film 20A has a laminated structure in which $TiO_2$ (refractive index at 500 nm: 2.467) as the high refractive index layer and $SiO_2$ (refractive index at 500 nm: 1.483) as the low refractive index layer are alternately laminated. However, the present embodiment is not limited to this configuration, and the above materials can be optionally selected.

As illustrated in FIG. 2, the second dielectric multilayer film includes at least one $H_2$ layer having a refractive index of 1.8 or more and 2.5 or less at 500 nm and a quarter wave optical thickness (QWOT) of 1.1 or more and 3.5 or less. The refractive index of the $H_2$ layer is preferably 1.9 or more and 2.5 or less, more preferably 2.0 or more and 2.5 or less, and further preferably 2.1 or more and 2.5 or less.

Here, the QWOT is obtained by the following formula.

QWOT=(physical film thickness/central wavelength)×4×refractive index

A unit of the physical film thickness is [nm], the central wavelength is 500 nm, and the refractive index is a refractive index at the wavelength of 500 nm.

As illustrated in FIG. 2, when a $H_2$ layer closest to the phosphate glass is defined as a first $H_2$ layer, the second dielectric multilayer film includes a first $M_2$ layer formed of a plurality of continuous layers satisfying a total QWOT of the respective layers of 1.2 or more and 1.8 or less between the first $H_2$ layer and the phosphate glass.

In the example illustrated in FIG. 2, the first $M_2$ layer is formed of four layers from a first layer to a fourth layer when the layer closest to the phosphate glass is defined as the first layer, but the first $M_2$ layer may be formed of any number of layers as long as the total QWOT of the respective layers is 1.2 or more and 1.8 or less. That is, the first $M_2$ layer may be a single layer satisfying a QWOT of 1.2 or more and 1.8 or less. However, from the viewpoint of improving productivity, the first $M_2$ layer is preferably formed of six or less layers, and more preferably three or less layers.

The present inventors have found that, when the second dielectric multilayer film has the above configuration, the first $M_2$ layer functions as a medium refractive index layer and a spectral waveform thereof becomes smooth, so that reflection can be prevented in a wide wavelength region from the visible light region to the near-infrared light region, and further, dependence of the reflection characteristics on an incident angle can be prevented, and stray light can be prevented.

More specifically, when the second dielectric multilayer film has the above configuration, the following characteristics are obtained.

(i-5) When a second dielectric multilayer film side is set as an incident direction, an average reflectance $R2_{750-1000(5deg)AVE}$ at a wavelength of 750 nm to 1,000 nm in a spectral reflectance curve at an incident angle of 5 degrees is 3% or less.

(i-6) When a second dielectric multilayer film side is set as an incident direction, an average reflectance $R2_{450-600(5deg)AVE}$ at a wavelength of 450 nm to 600 nm in a spectral reflectance curve at an incident angle of 5 degrees is 3% or less.

(i-7) When a second dielectric multilayer film side is set as an incident direction, an average reflectance $R2_{750-1000(50deg)AVE}$ at a wavelength of 750 nm to 1,000 nm in a spectral reflectance curve at an incident angle of 50 degrees is 5% or less.

(i-8) When a second dielectric multilayer film side is set as an incident direction, an average reflectance $R2_{450-600(50deg)AVE}$ at a wavelength of 450 nm to 600 nm in a spectral reflectance curve at an incident angle of 50 degrees is 5% or less.

In the present embodiment, the first $M_2$ layer may be disposed at any position between the first $H_2$ layer and the phosphate glass. Specifically, in FIG. 2, the first $M_2$ layer is formed by all of the layers (first layer to fourth layer) included between the phosphate glass and the first $H_2$ layer, but layers from the layer closest to the phosphate glass (first layer) to a third closest layer (third layer) may be defined as the first $M_2$ layer (in this case, total QWOT of first layer to third layer is 1.423), and $SiO_2$ closest to the first $H_2$ layer (fourth layer) may be an optional layer.

In the case where there are several layers of the single layer satisfying a QWOT of 1.2 or more and 1.8 or less or the plurality of continuous layers satisfying a total QWOT of 1.2 or more and 1.8 or less between the first $H_2$ layer and the phosphate glass, any of the corresponding single layer or the plurality of continuous layers is set as the first $M_2$ layer, and the other layers are set as optional layers.

As described above, in the present embodiment, as long as the first $M_2$ layer is included between the first $H_2$ layer and the phosphate glass, an optional layer may be included between the first $H_2$ layer and the phosphate glass as long as an effect of the present invention is not impaired. The optional layer may be included, for example, between the phosphate glass and the first $M_2$ layer or between the first $M_2$ layer and the first $H_2$ layer. However, from the viewpoint of preventing reflection, it is most preferable that an optional layer does not exist between the first $H_2$ layer and the phosphate glass. That is, the first $H_2$ layer, the first $M_2$ layer, and the phosphate glass are preferably continuously formed.

Examples of a material of the optional layer include the above high refractive index layer, medium refractive index layer, and low refractive index layer.

The second dielectric multilayer film may have a configuration including two or more $H_2$ layers as illustrated in FIG. 3. In this case, as illustrated in FIG. 3, when a layer second closest to the phosphate glass is defined as a second $H_2$ layer, it is preferable that the second dielectric multilayer film includes a second $M_2$ layer formed of a plurality of continuous layers satisfying a total QWOT of respective layers of 1.2 or more and 2.1 or less between the first $H_2$ layer and the second $H_2$ layer. When the second $M_2$ layer is included between the first $H_2$ layer and the second $H_2$ layer, the second $M_2$ layer functions as the medium refractive index layer, and the spectral waveform thereof becomes smooth, so that reflection in a wide wavelength region from the visible light region to the near-infrared light region is further prevented.

In the example illustrated in FIG. 3, the second $M_2$ layer is formed of three layers from a sixth layer to an eighth layer, but the second $M_2$ layer may be formed of any number of layers as long as the total QWOT of the respective layers is 1.2 or more and 2.1 or less. That is, the second $M_2$ layer may be a single layer satisfying a QWOT of 1.2 or more and 2.1 or less. However, from the viewpoint of improving productivity, the second $M_2$ layer is preferably formed of six or less layers, and more preferably three or less layers.

Further, in the present embodiment, as illustrated in FIG. 4, it is preferable that between the first $H_2$ layer and the second $H_2$ layer, two layers of the single layers satisfying a QWOT of 1.2 or more and 2.1 or less or the plurality of continuous layers satisfying a total QWOT of 1.2 or more and 2.1 or less are included. In this case, as illustrated in FIG. 4, a layer closest to the second $H_2$ layer among the corresponding single layers or plurality of continuous layers is defined as the second $M_2$ layer, and a layer second closest to the second $H_2$ layer is defined as a third $M_2$ layer. That is, the second dielectric multilayer film preferably includes, in addition to the above second $M_2$ layer, the third $M_2$ layer formed of the single layer satisfying a QWOT of 1.2 or more and 2.1 or less or the plurality of layers satisfying a total QWOT of 1.2 or more and 2.1 or less between the first $H_2$ layer and the second $M_2$ layer.

When the second dielectric multilayer film has such a configuration, the third $M_2$ layer functions as the medium refractive index layer, and the spectral waveform thereof becomes smooth, so that reflection in a wide wavelength region from the visible light region to the near-infrared light region is further prevented.

The second $M_2$ layer and the third $M_2$ layer may be disposed at any position as long as the layer close to the second $H_2$ layer is the second $M_2$ layer as described above.

In the example illustrated in FIG. 4, between the first $H_2$ layer and the second $H_2$ layer, two layers (second $M_2$ layer and third $M_2$ layer) of the single layer satisfying a QWOT of 1.2 or more and 2.1 or less or the plurality of continuous layers satisfying a total QWOT of 1.2 or more and 2.1 or less are provided, but the corresponding single layer or plurality of continuous layers may be included by three or more.

An optional layer may be included between the first $H_2$ layer and the second $H_2$ layer in addition to the second $M_2$ layer and the third $M_2$ layer as long as the effect of the present invention is not impaired. Examples of the optional layer include the same layers as those described above. However, from the viewpoint of improving productivity, it is preferable that the optional layer does not exist. That is, the second $H_2$ layer, the second $M_2$ layer, the third $M_2$ layer, and the first $H_2$ layer are most preferably continuously formed.

Even in the case where the third $M_2$ layer is not provided, it is preferable that the optional layer is not present, and the second $H_2$ layer, the second $M_2$ layer, and the first $H_2$ layer are continuously formed.

From the viewpoint of further preventing reflection, it is preferable that QWOTs of the first $H_2$ layer and the second $H_2$ layer in the second dielectric multilayer film are different from each other. From the same viewpoint, it is preferable that values of the QWOT of the single layer or the total QWOT of the plurality of continuous layers forming the first $M_2$ layer, the second $M_2$ layer, and the third $M_2$ layer are different from each other.

The total number of laminated layers of the dielectric layers in the second dielectric multilayer film is preferably 10 to 30, and more preferably 10 to 20. When the total number of laminated layers is within the above range, an increase in film thickness per layer can be prevented.

A total film thickness of the second dielectric multilayer film is preferably 0.5 μm to 2.0 μm, and more preferably 0.5 μm to 1.0 μm. When the film thickness of the second dielectric multilayer film is within the above range, an increase in film thickness per layer can be prevented.

For formation of the second dielectric multilayer film and the first dielectric multilayer film to be described later, for example, a vacuum film formation process such as a CVD method, a sputtering method, or a vacuum deposition method, a wet film formation process such as a spraying method or a dipping method, or the like can be used.

<First Dielectric Multilayer Film>

In the filter, the first dielectric multilayer film preferably prevents reflection in the visible light region and the near-infrared light region. Since the first dielectric multilayer film prevents the reflection in the visible light region and the near-infrared light region, generation of a ripple in the visible light region is reduced, and further, spectral characteristics are less likely to change with respect to light at a high incident angle, thereby obtaining an optical filter in which stray light is prevented.

The first dielectric multilayer film is a multilayer film in which a plurality of layers having different refractive indices are included and these layers are alternately laminated. More specifically, examples of the layers include a dielectric layer having a low refractive index (low refractive index layer), a dielectric layer having a medium refractive index (medium refractive index layer), and a dielectric layer having a high refractive index (high refractive index layer), and the first dielectric multilayer film is a multilayer film in which two or more dielectric layers among those are alternately laminated.

Examples of the refractive indices and materials of the high refractive index layer, the medium refractive index layer, and the low refractive index layer are the same as those of the second dielectric multilayer film.

(Configuration of First Dielectric Multilayer Film)

In the present embodiment, as illustrated in FIG. 2, the first dielectric multilayer film includes at least one $H_1$ layer satisfying a refractive index of 1.8 or more and 2.5 or less at 500 nm and a QWOT of 1.1 or more and 3.5 or less. The refractive index of the $H_1$ layer is preferably 1.9 or more and 2.5 or less, more preferably 2.0 or more and 2.5 or less, and further preferably 2.1 or more and 2.5 or less.

As illustrated in FIG. 2, when the $H_1$ layer closest to the resin film is defined as a first $H_1$ layer, it is preferable that the first dielectric multilayer film includes a first $M_1$ layer formed of a plurality of continuous layers satisfying a total QWOT of respective layers of 1.2 or more and 1.8 or less between the first $H_1$ layer and the resin film.

That is, similar to the second dielectric multilayer film having the configuration including the first $H_2$ layer and the first $M_2$ layer, the first dielectric multilayer film also preferably includes the first $H_1$ layer and the first $M_1$ layer. When the first dielectric multilayer film has the above configuration, the first $M_1$ layer functions as the medium refractive index layer, and the spectral waveform thereof becomes smooth, so that reflection in a wide wavelength region from the visible light region to an infrared light region is further prevented when light is incident from a resin surface of the optical filter.

More specifically, when the first dielectric multilayer film has the above configuration, the following characteristics are obtained.

(i-13) When a first dielectric multilayer film side is set as an incident direction, an average reflectance $R1_{750-1000(5deg)AVE}$ at a wavelength of 750 nm to 1,000 nm in a spectral reflectance curve at an incident angle of 5 degrees is 3% or less.

(i-14) When a first dielectric multilayer film side is set as an incident direction, an average reflectance $R1_{450-600(5deg)AVE}$ at a wavelength of 450 nm to 600 nm in a spectral reflectance curve at an incident angle of 5 degrees is 3% or less.

(i-15) When a first dielectric multilayer film side is set as an incident direction, an average reflectance $R1_{750-1000(50deg)AVE}$ at a wavelength of 750 nm to 1,000 nm in a spectral reflectance curve at an incident angle of 50 degrees is 5% or less.

(i-16) When a first dielectric multilayer film side is set as an incident direction, an average reflectance $R1_{450-600(50deg)AVE}$ at a wavelength of 450 nm to 600 nm in a spectral reflectance curve at an incident angle of 50 degrees is 5% or less.

The first $M_1$ layer may be disposed at any position between the first $H_1$ layer and the resin film. Specifically, in FIG. 2, the first $M_1$ layer is formed by all of the layers (first layer to fourth layer) included between the resin film and the first $H_1$ layer, but layers from the layer closest to the resin film (first layer) to a third closest layer (third layer) may be defined as the first $M_1$ layer (in this case, total QWOT of first layer to third layer is 1.423), and $SiO_2$ closest to the first $H_1$ layer (fourth layer) may be an optional layer.

In the case where there are several layers of the single layer satisfying a QWOT of 1.2 or more and 1.8 or less or the plurality of continuous layers satisfying a total QWOT of 1.2 or more and 1.8 or less between the first $H_1$ layer and the resin film, any of the corresponding single layer or the plurality of continuous layers is set as the first $M_1$ layer, and the other layers are set as optional layers.

As described above, an optional layer may be included between the first $H_1$ layer and the resin film as long as the effect of the present invention is not impaired. The optional layer may be included, for example, between the resin film and the first $M_1$ layer or between the first $M_1$ layer and the first $H_1$ layer. Examples of the optional layer include the same layers as those described above.

Further, the first dielectric multilayer film may have a configuration including two or more $H_1$ layers as illustrated in FIG. 3. In this case, when a layer second closest to the resin film is defined as a second $H_1$ layer, it is preferable that the first dielectric multilayer film includes a second $M_1$ layer formed of a plurality of continuous layers satisfying a total QWOT of 1.2 or more and 2.1 or less between the first $H_1$ layer and the second $H_1$ layer. When the second $M_1$ layer is included between the first $H_2$ layer and the second $H_2$ layer, the second $M_1$ layer functions as the medium refractive index layer, and the spectral waveform thereof becomes smooth, so that reflection is further prevented when light is incident from a resin surface of the optical filter.

The second $M_1$ layer may include any number of layers as long as a total QWOT of the respective layers is 1.2 or more and 2.1 or less. That is, the second $M_1$ layer may be a single layer satisfying a QWOT of 1.2 or more and 2.1 or less. However, from the viewpoint of improving productivity, the second $M_1$ layer is preferably formed of six or less layers, and more preferably three or less layers.

Further, in the present embodiment, as illustrated in FIG. 4, it is preferable that between the first $H_1$ layer and the second $H_1$ layer, two layers of the single layer satisfying a QWOT of 1.2 or more and 2.1 or less or the plurality of continuous layers satisfying a total QWOT of 1.2 or more and 2.1 or less are included. In this case, a layer closest to the second $H_1$ layer among the corresponding single layers or plurality of continuous layers is defined as the second $M_1$ layer, and a layer second closest to the second $H_1$ layer is defined as a third $M_1$ layer. That is, the first dielectric multilayer film preferably includes, in addition to the above second $M_1$ layer, the third $M_1$ layer formed of the single layer satisfying a QWOT of 1.2 or more and 2.1 or less or the plurality of layers satisfying a total QWOT of 1.2 or more and 2.1 or less between the first $H_1$ layer and the second $M_1$ layer.

When the first dielectric multilayer film has such a configuration, the third $M_1$ layer functions as the medium refractive index layer, and the spectral waveform thereof becomes smooth, so that reflection in a wide wavelength region from the visible light region to the near-infrared light region is further prevented.

The second $M_1$ layer and the third $M_1$ layer may be disposed at any position as long as the layer close to the second $H_1$ layer is the second $M_1$ layer as described above.

In the example illustrated in FIG. 4, between the first $H_1$ layer and the second $H_1$ layer, two layers (second $M_1$ layer and third $M_1$ layer) of the single layer satisfying a QWOT of 1.2 or more and 2.1 or less or the plurality of continuous layers satisfying a total QWOT of 1.2 or more and 2.1 or less are provided, but the corresponding single layer or plurality of layers may be included by three or more.

An optional layer may be included between the first $H_1$ layer and the second $H_1$ layer in addition to the second $M_1$ layer and the third $M_1$ layer as long as the effect of the present invention is not impaired. Examples of the optional layer include the same layers as those described above. However, from the viewpoint of improving productivity, it is preferable that the optional layer does not exist. That is, the second $H_1$ layer, the second $M_1$ layer, the third $M_1$ layer, and the first $H_1$ layer are most preferably continuously formed.

Even in the case where the third $M_1$ layer is not provided, it is preferable that the optional layer does not exist, and the second $H_1$ layer, the second $M_1$ layer, and the first $H_1$ layer are continuously formed.

From the viewpoint of further preventing reflection, it is preferable that QWOTs of the first $H_1$ layer and the second $H_1$ layer in the first dielectric multilayer film are different from each other. From the same viewpoint, it is preferable that values of the QWOT of the single layer or the total QWOT of the plurality of continuous layers forming the first $M_1$ layer, the second $M_1$ layer, and the third $M_1$ layer are different from each other.

The total number of laminated layers of the dielectric layers in the first dielectric multilayer film is preferably 10 to 30, and more preferably 10 to 20. When the total number of laminated layers is within the above range, an increase in film thickness per layer can be prevented.

A total film thickness of the first dielectric multilayer film is preferably 0.5 μm to 2.0 μm, and more preferably 0.5 μm to 1.0 μm. When the film thickness of the first dielectric multilayer film is within the above range, an increase in film thickness per layer can be prevented.

<Phosphate Glass>

The phosphate glass preferably satisfies all of the following spectral characteristics (ii-1) to (ii-5).

(ii-1) An internal transmittance $T_{450}$ at a wavelength of 450 nm is 92% or more.

(ii-2) An average internal transmittance $T_{450-600AVE}$ at a wavelength of 450 nm to 600 nm is 90% or more.

(ii-3) A wavelength IR50 at which an internal transmittance is 50% is in a wavelength range of 625 nm to 650 nm.

(ii-4) An average internal transmittance $T_{750-1000AVE}$ at a wavelength of 750 nm to 1,000 nm is 2.5% or less.

(ii-5) An average internal transmittance $T_{1000-1200AVE}$ at a wavelength of 1,000 nm to 1,200 nm is 7% or less.

Satisfying the spectral characteristic (ii-1) means that a transmittance in a blue light region is excellent, and satisfying the spectral characteristic (ii-2) means that the transmittance in the visible light region of 450 nm to 600 nm is excellent.

The internal transmittance $T_{450}$ is more preferably 93% or more, and further preferably 95% or more.

The average internal transmittance $T_{450-600AVE}$ is more preferably 94% or more, and further preferably 95% or more.

Satisfying the spectral characteristic (ii-3) means that light in the near-infrared light region can be shielded and visible transmitted light can be efficiently taken in.

The wavelength IR50 is more preferably in a range of 625 nm to 645 nm, and further preferably in a range of 625 nm to 640 nm.

Satisfying the spectral characteristic (ii-4) means that the light-shielding properties in the near-infrared light region of 750 nm to 1,000 nm are excellent.

$T_{750-1000AVE}$ is more preferably 2% or less, and further preferably 1.2% or less.

Satisfying the spectral characteristic (ii-5) means that the light-shielding properties in the near-infrared light region of 1,000 nm to 1,200 nm are excellent. The average internal transmittance $T_{1000-1200AVE}$ is more preferably 6.8% or less, and further preferably 6.5% or less.

In the present invention, it is preferable that the phosphate glass start to absorb near-infrared light from a region of 625 nm to 650 nm as shown in the above characteristic (ii-3), and exhibits high light-shielding properties after 750 nm as shown in the above characteristic (ii-4). Accordingly, a substrate capable of compensating for the light-shielding properties of the above-described dielectric multilayer film is obtained.

In the present invention, the phosphate glass means a glass containing 40% or more of $P_2O_5$ in terms of mass percentage based on oxide. The phosphate glass preferably contains copper ions. By containing copper ions that absorb light having a wavelength in the vicinity of 900 nm, near-infrared light of 700 nm to 1,200 nm can be shielded. The phosphate glass also includes a phosphosilicate glass in which a part of a skeleton of the glass is formed of $SiO_2$.

For example, it is preferable that the phosphate glass contains the following components constituting the glass. Respective content ratios of the following glass constituent components are expressed in terms of mass percentage based on oxide:

40% to 80% of $P_2O_5$, 0.5% to 20% of $Al_2O_3$, 0.5% to 20% of $\Sigma R_2O$ (where $R_2O$ is one or more components selected from $Li_2O$, $Na_2O$, $K_2O$, $Rb_2O$, and $Cs_2O$, and $\Sigma R_2O$ is a total content of $R_2O$), 0% to 40% of $\Sigma R'O$ (where R'O is one or more components selected from CaO, MgO, BaO, SrO, and ZnO, and $\Sigma R'O$ is a total content of R'O), and 0.5% to 40% of CuO.

$P_2O_5$ is a main component forming the glass, and is a component for enhancing a near-infrared ray cutting property. When a content of $P_2O_5$ is 40% or more, an effect thereof can be sufficiently obtained, and when the content of $P_2O_5$ is 80% or less, problems such as glass instability and reduction in weather resistance are less likely to occur. Therefore, the content of $P_2O_5$ is preferably 40% to 80%, more preferably 45% to 78%, further preferably 50% to 77%, still more preferably 55% to 76%, and most preferably 60% to 75%.

$Al_2O_3$ is a main component forming the glass, and is a component for enhancing strength of the glass, enhancing the weather resistance of the glass, and the like. When a content of $Al_2O_3$ is 0.5% or more, an effect thereof can be sufficiently obtained, and when the content of $Al_2O_3$ is 20% or less, problems such as glass instability and reduction in near-infrared ray cutting property are less likely to occur. Therefore, the content of $Al_2O_3$ is preferably 0.5% to 20%, more preferably 1.0% to 20%, further preferably 2.0% to 18%, still more preferably 3.0% to 17%, particularly preferably 4.0% to 16%, and most preferably 5.0% to 15.5%.

$R_2O$ (where $R_2O$ is one or more components selected from $Li_2O$, $Na_2O$, $K_2O$, $Rb_2O$, and $Cs_2O$) is a component for lowering a melting temperature of the glass, lowering a liquid phase temperature of the glass, stabilizing the glass, and the like. When a total content of $R_2O$ ($\Sigma R_2O$) is 0.5% or more, an effect thereof is sufficiently obtained, and when the total content of $R_2O$ is 20% or less, glass instability is less likely to occur, which is preferable. Therefore, the total content of $R_2O$ is preferably 0.5% to 20%, more preferably 1.0% to 19%, further preferably 1.5% to 18%, still more preferably 2.0% to 17%, particularly preferably 2.5% to 16%, and most preferably 3.0% to 15.5%.

$Li_2O$ is a component for lowering the melting temperature of the glass, lowering the liquid phase temperature of the glass, stabilizing the glass, and the like. A content of $Li_2O$ is preferably 0% to 15%. When the content of $Li_2O$ is 15% or less, problems such as glass instability and reduction in near-infrared ray cutting property are less likely to occur, which is preferable. The content of $Li_2O$ is more preferably 0% to 8%, further preferably 0% to 7%, still more preferably 0% to 6%, and most preferably 0% to 5%.

$Na_2O$ is a component for lowering the melting temperature of the glass, lowering the liquid phase temperature of the glass, stabilizing the glass, and the like. A content of $Na_2O$ is preferably 0% to 15%. When the content of $Na_2O$ is 15% or less, glass instability is less likely to occur, which is preferable. The content of $Na_2O$ is more preferably 0.5% to 14%, further preferably 1% to 13%, still more preferably 2% to 13%, and most preferably 3% to 13%.

$K_2O$ is a component having effects such as lowering the melting temperature of the glass and lowering the liquid phase temperature of the glass. A content of $K_2O$ is preferably 0% to 20%. When the content of $K_2O$ is 20% or less, glass instability is less likely to occur, which is preferable. The content of $K_2O$ is more preferably 0.5% to 19%, further preferably 1% to 18%, still more preferably 2% to 17%, and most preferably 3% to 16%.

$Rb_2O$ is a component having effects such as lowering the melting temperature of the glass and lowering the liquid phase temperature of the glass. A content of $Rb_2O$ is preferably 0% to 15%. When the content of $Rb_2O$ is 15% or less, glass instability is less likely to occur, which is preferable. The content of $Rb_2O$ is more preferably 0.5% to 14%, further preferably 1% to 13%, still more preferably 2% to 13%, and most preferably 3% to 13%.

$Cs_2O$ is a component having effects such as lowering the melting temperature of the glass and lowering the liquid phase temperature of the glass. A content of $Cs_2O$ is preferably 0% to 15%. When the content of $Cs_2O$ is 15% or less, glass instability is less likely to occur, which is preferable. The content of $Cs_2O$ is more preferably 0.5% to 14%, further preferably 1% to 13%, still more preferably 2% to 13%, and most preferably 3% to 13%.

When two or more of the above alkali metal components represented by $R_2O$ are added at the same time, a mixed alkali effect is generated in the glass, and a mobility of $R^+$ ions is reduced. Accordingly, when the glass comes into contact with water, a hydration reaction caused by ion exchange between $H^+$ ions in water molecules and the $R^+$ ions in the glass is inhibited, and the weather resistance of the glass is improved. Therefore, the phosphate glass of the present embodiment preferably contains two or more components selected from $Li_2O$, $Na_2O$, $K_2O$, $Rb_2O$, and $Cs_2O$. In this case, the total content ($\Sigma R_2O$) of $R_2O$ (where $R_2O$ is $Li_2O$, $Na_2O$, $K_2O$, $Rb_2O$, and $Cs_2O$) is preferably more than 7% and 18% or less. When the total content of $R_2O$ is more than 7%, the effect thereof is sufficiently obtained, and when the total content of $R_2O$ is 18% or less, problems such as glass instability, reduction in near-infrared ray cutting property, and reduction in strength of the glass are less likely to occur, which is preferable. Therefore, $\Sigma R_2O$ is preferably more than 7% and 18% or less, more preferably 7.5% to 17%, further preferably 8% to 16%, still more preferably 8.5% to 15%, and most preferably 9% to 14%.

R'O (where R'O is one or more components selected from CaO, MgO, BaO, SrO, and ZnO) is a component for lowering the melting temperature of the glass, lowering the liquid phase temperature of the glass, stabilizing the glass, enhancing the strength of the glass, and the like. A total content of R'O ($\Sigma R'O$) is preferably 0% to 40%. When the total content of R'O is 40% or less, problems such as glass instability, reduction in near-infrared ray cutting property, and reduction in strength of the glass are less likely to occur, which is preferable. The total content of R'O is more preferably 0% to 35%, and further preferably 0% to 30%. The total content of R'O is still more preferably 0% to 25%, particularly preferably 0% to 20%, and most preferably 0% to 15%.

CaO is a component for lowering the melting temperature of the glass, lowering the liquid phase temperature of the glass, stabilizing the glass, enhancing the strength of the glass, and the like. A content of CaO is preferably 0% to 10%. When the content of CaO is 10% or less, problems such as glass instability and reduction in near-infrared ray cutting property are less likely to occur, which is preferable. The content of CaO is more preferably 0% to 8%, further preferably 0% to 6%, still more preferably 0% to 5%, and most preferably 0% to 4%.

MgO is a component for lowering the melting temperature of the glass, lowering the liquid phase temperature of the glass, stabilizing the glass, enhancing the strength of the glass, and the like. A content of MgO is preferably 0% to 15%. When the content of MgO is 15% or less, problems such as glass instability and reduction in near-infrared ray cutting property are less likely to occur, which is preferable. The content of MgO is more preferably 0% to 13%, further preferably 0% to 10%, still more preferably 0% to 9%, and most preferably 0% to 8%.

BaO is a component for lowering the melting temperature of the glass, lowering the liquid phase temperature of the glass, stabilizing the glass, and the like. A content of BaO is preferably 0% to 40%. When the content of BaO is 40% or less, problems such as glass instability and reduction in near-infrared ray cutting property are less likely to occur, which is preferable. The content of BaO is more preferably 0% to 30%, further preferably 0% to 20%, still more preferably 0% to 10%, and most preferably 0% to 5%.

SrO is a component for lowering the melting temperature of the glass, lowering the liquid phase temperature of the glass, stabilizing the glass, and the like. A content of SrO is preferably 0% to 10%. When the content of SrO is 10% or less, problems such as glass instability and reduction in near-infrared ray cutting property are less likely to occur, which is preferable. The content of SrO is more preferably 0% to 8%, further preferably 0% to 7%, and most preferably 0% to 6%.

ZnO has effects such as lowering the melting temperature of the glass and lowering the liquid phase temperature of the glass. A content of ZnO is preferably 0% to 15%. When the content of ZnO is 15% or less, problems such as glass instability, deterioration in solubility of the glass, and reduction in near-infrared ray cutting property are less likely to occur, which is preferable. The content of ZnO is more preferably 0% to 13%, further preferably 0% to 10%, still more preferably 0% to 9%, and most preferably 0% to 8%.

CuO is a component for enhancing the near-infrared ray cutting property. A content of CuO is preferably 0.5% to 40%. When the content of CuO is 0.5% or more, an effect thereof can be sufficiently obtained, and when the content of CuO is 40% or less, problems such as generation of devitrification foreign matters in the glass and reduction in transmittance of light in a visible region are less likely to occur, which is preferable. The content of CuO is more preferably 1.0% to 35%, further preferably 1.5% to 30%, still more preferably 2.0% to 25%, and most preferably 2.5% to 20%.

In the phosphate glass according to the present embodiment, F may be contained in a range of 10% or less in order to enhance the weather resistance. When a content of F is 10% or less, problems such as reduction in near-infrared ray cutting property and generation of devitrification foreign matters in the glass are less likely to occur, which is preferable. The content of F is more preferably 9% or less, further preferably 8% or less, still more preferably 7% or less, particularly preferably 6% or less, and most preferably 5% or less.

$B_2O_3$ may be contained in a range of 10% or less for stabilizing the glass. When a content of $B_2O_3$ is 10% or less, problems such as deterioration in weather resistance of the glass and reduction in near-infrared ray cutting property are less likely to occur, which is preferable. The content of $B_2O_3$ is more preferably 9% or less, further preferably 8% or less, still more preferably 7% or less, particularly preferably 6% or less, and most preferably 5% or less.

In the present embodiment, $SiO_2$, $GeO_2$, $ZrO_2$, $SnO_2$, $TiO_2$, $CeO_2$, $MoO_3$, WO3, $Y_2O_3$, $La_2O_3$, $Gd_2O_3$, $Yb_2O_3$, and $Nb_2O_5$ may be contained in a range of 5% or less in order to improve the weather resistance of the phosphate glass. When a content of these components is 5% or less, problems such as generation of devitrification foreign matters in the glass and reduction in near-infrared ray cutting property are less likely to occur, which is preferable. The content of these components is preferably 4% or less, more preferably 3% or less, further preferably 2% or less, and still more preferably 1% or less.

Any of $Fe_2O_3$, $Cr_2O_3$, $Bi_2O_3$, NiO, $V_2O_5$, $MnO_2$, and CoO is a component that reduces the transmittance of light in the visible region by being present in the phosphate glass. Therefore, it is preferable that these components are not substantially contained in the glass.

In the present invention, the expression "a specific component is not substantially contained" means that the component is not intentionally added, and does not exclude inclusion of the component to the extent that the component is unavoidably mixed in from raw materials, or the like, and does not affect desired properties.

A thickness of the phosphate glass is preferably 0.5 mm or less and more preferably 0.3 mm or less from the viewpoint of a reduction in height of camera modules, and is preferably 0.1 mm or more and more preferably 0.15 mm or more from the viewpoint of maintenance of device strength.

The phosphate glass can be prepared as follows, for example.

First, raw materials are weighed and mixed so as to fall within the above composition range (mixing step). The raw material mixture is accommodated in a platinum crucible, and heated and melted at a temperature of 700° C. to 1,400° C. in an electric furnace (melting step). After being sufficiently stirred and refined, the raw material mixture is cast into a mold, cut and polished to form a flat plate having a predetermined thickness (molding step).

In the melting step of the above manufacturing method, the highest temperature of the glass during glass melting is preferably 1,400° C. or lower. When the highest temperature of the glass during glass melting is higher than the above temperature, transmittance characteristics may deteriorate. The above temperature is more preferably 1,350° C. or lower, further preferably 1,300° C. or lower, and still more preferably 1,250° C. or lower.

When the temperature in the above melting step is too low, problems such as occurrence of devitrification during melting and requirement of a long time for burn through may occur, and thus the temperature is preferably 700° C. or higher, and more preferably 800° C. or higher.

<Resin Film>

The resin film in the optical filter according to the present invention includes the resin and the near-infrared ray absorbing dye having a maximum absorption wavelength in 690 nm to 800 nm in the resin. Here, the resin refers to a resin constituting the resin film.

The resin film preferably satisfies all of the following spectral characteristics (iii-1) to (iii-3).

(iii-1) An internal transmittance $T_{450}$ at a wavelength of 450 nm is 85% or more.

(iii-2) An average internal transmittance $T_{450-600AVE}$ at a wavelength of 450 nm to 600 nm is 90% or more.

(iii-3) A wavelength IR50 at which an internal transmittance is 50% is in a wavelength range of 660 nm to 700 nm.

Satisfying the spectral characteristic (iii-1) means that a transmittance in a blue light region is excellent.

The internal transmittance $T_{450}$ is more preferably 87% or more, and further preferably 90% or more.

Satisfying the spectral characteristic (iii-2) means that the transmittance in the visible light region of 450 nm to 600 nm is excellent.

The average internal transmittance $T_{450-600AVE}$ is more preferably 93% or more, and further preferably 95%.

By satisfying the spectral characteristic (iii-3), it is possible to obtain an optical filter in which dependence of the spectral characteristic on an incident angle is prevented in a range of 630 nm to 680 nm when used in combination with the above-described phosphate glass.

The wavelength IR50 is more preferably in a range of 660 nm to 690 nm, and further preferably in a range of 665 nm to 685 nm.

Since the resin film of the present invention contains a dye having a maximum absorption wavelength in 690 nm to 800 nm, a near-infrared light region in the vicinity of 700 nm where the light-shielding properties are slightly weak in the phosphate glass can be shielded by absorption characteristics of the dye.

Examples of the near-infrared ray absorbing dye include at least one selected from the group consisting of a cyanine dye, a phthalocyanine dye, a squarylium dye, a naphthalocyanine dye, and a diimonium dye, and one thereof or a plurality thereof as a mixture can be used. Among those, the squarylium dye and the cyanine dye are preferable from the viewpoint of easily exhibiting the effect of the present invention.

A content of the near-infrared ray absorbing dye in the resin film is preferably 0.1 parts by mass to 30 parts by mass, and more preferably 0.1 parts by mass to 20 parts by mass with respect to 100 parts by mass of the resin. When two or more compounds are combined, the above content is a sum of respective compounds.

The resin film may contain other dyes, for example, an ultraviolet light-absorbing dye, as long as the effect of the present invention is not impaired.

Examples of the ultraviolet light-absorbing dye include an oxazole dye, a merocyanine dye, a cyanine dye, a naphthalimide dye, an oxadiazole dye, an oxazine dye, an oxazolidine dye, a naphthalic acid dye, a styryl dye, an anthracene dye, a cyclic carbonyl dye, and a triazole dye. Among those, the merocyanine dye is particularly preferable. These dyes may be used alone, or may be used in combination of two or more kinds thereof.

The resin is not limited as long as it is a transparent resin, and one or more kinds of transparent resins selected from a polyester resin, an acrylic resin, an epoxy resin, an ene-thiol resin, a polycarbonate resin, a polyether resin, a polyarylate resin, a polysulfone resin, a polyethersulfone resin, a poly (p-phenylene) resin, a polyarylene ether phosphine oxide resin, a polyamide resin, a polyimide resin, a polyamide-imide resin, a polyolefin resin, a cyclic olefin resin, a polyurethane resin, a polystyrene resin, and the like are used. These resins may be used alone, or may be used by mixing two or more kinds thereof.

One or more kinds of resins selected from the polyimide resin, the polycarbonate resin, the polyester resin, and the acrylic resin are preferable from the viewpoint of spectral characteristics, a glass transition temperature (Tg), and adhesion of the resin film.

In the case where a plurality of dyes are used, these dyes may be contained in the same resin film or may be contained in different resin films.

The resin film can be formed by dissolving or dispersing a dye, a resin or a raw material component of the resin, and respective components blended as necessary in a solvent to prepare a coating solution, applying the coating solution to a support, drying the coating solution, and further curing the coating solution as necessary. The support in this case may be the phosphate glass used for the filter, or may be a peelable support used only when the resin film is to be formed. The solvent may be a dispersion medium capable of stably dispersing components or a solvent capable of dissolving components.

The coating solution may contain a surfactant in order to improve voids due to fine bubbles, depressions due to adhesion of foreign matters and the like, and repelling in a drying step. Further, for the application of the coating solution, for example, a dip coating method, a cast coating method, or a spin coating method can be used. The above coating solution is applied onto the support and then dried to form a resin film. When the coating solution contains a raw material component of the transparent resin, a curing process such as thermal curing or photocuring is further performed.

The resin film can also be manufactured into a film shape by extrusion molding. A substrate can be manufactured by laminating the obtained film-shaped resin film on the phosphate glass and integrating the resin film and the phosphate glass by thermal press fitting or the like.

The optical filter may have one layer of the resin film, or may have two or more layers of the resin film. When the optical filter has two or more layers of the resin film, respective layers may have the same configuration or different configurations.

A thickness of the resin film is preferably 10 µm or less and more preferably 5 µm or less from the viewpoint of in-plane film thickness distribution and appearance quality in a substrate after coating, and is preferably 0.5 µm or more from the viewpoint of exhibiting desired spectral characteristics at an appropriate dye concentration. When the optical filter has two or more layers of resin films, a total thickness of the respective resin films is preferably within the above range.

<Others>

The filter may include, as another component, for example, a component (layer) that provides absorption by inorganic fine particles or the like that control transmission and absorption of light in a specific wavelength region. Specific examples of the inorganic fine particles include indium tin oxides (ITO), antimony-doped tin oxides (ATO), cesium tungstate, and lanthanum boride. The ITO fine particles and the cesium tungstate fine particles have a high visible light transmittance and have light absorbing properties in a wide range of an infrared wavelength region exceeding 1,200 nm, and thus can be used in the case where light-shielding properties of infrared light are required.

As described above, the present description discloses the following optical filter and the like.

[1] An optical filter including a first dielectric multilayer film, a resin film, a phosphate glass, and a second dielectric multilayer film in this order, in which the resin film includes a resin and a dye having a maximum absorption wavelength in 690 nm to 800 nm in the resin, the first dielectric multilayer film and the second dielectric multilayer film each includes a plurality of layers having different refractive indices, the second dielectric multilayer film includes at least one $H_2$ layer satisfying a refractive index of 1.8 or more and 2.5 or less and a QWOT of 1.1 or more and 3.5 or less, and when a layer closest to the phosphate glass in the $H_2$ layers is defined as a first $H_2$ layer, the second dielectric multilayer film includes a first $M_2$ layer including a single layer satisfying a QWOT of 1.2 or more and 1.8 or less or a plurality of layers satisfying a total QWOT of 1.2 or more and 1.8 or less between the first $H_2$ layer and the phosphate glass, and the optical filter satisfies all of the following spectral characteristics (i-1) to (i-4):

(i-1) in a spectral transmittance curve at an incident angle of 0 degrees, an average transmittance $T_{450-550(0deg)AVE}$ at a wavelength of 450 nm to 550 nm is 85% or more (i-2) in a spectral transmittance curve at an incident angle of 50 degrees, an average transmittance $T_{450-550(50deg)AVE}$ at a wavelength of 450 nm to 550 nm is 85% or more (i-3) in a spectral transmittance curve at an incident angle of 0 degrees, an average transmittance $T_{750-1000(0deg)AVE}$ at a wavelength of 750 nm to 1,000 nm is 2.5% or less (i-4) in a spectral transmittance curve at an incident angle of 50 degrees, an average transmittance $T_{750-1000(50deg)AVE}$ at a wavelength of 750 nm to 1,000 nm is 2.5% or less.

[2] An optical filter including a first dielectric multilayer film, a resin film, a phosphate glass, and a second dielectric multilayer film in this order, in which the resin film includes a resin and a dye having a maximum absorption wavelength in 690 nm to 800 nm in the resin, the first dielectric multilayer film and the second dielectric multilayer film each includes a plurality of layers having different refractive indices, the first dielectric multilayer film includes at least one $H_1$ layer satisfying a refractive index of 1.8 or more and 2.5 or less and a QWOT of 1.1 or more and 3.5 or less, and when a layer closest to the resin film in the $H_1$ layers is defined as a first $H_1$ layer, the first dielectric multilayer film includes a first $M_1$ layer including a single layer satisfying a QWOT of 1.2 or more and 1.8 or less or a plurality of layers satisfying a total QWOT of 1.2 or more and 1.8 or less between the first $H_1$ layer and the resin film, and the optical filter satisfies all of the following spectral characteristics (i-1) to (i-4):

(i-1) in a spectral transmittance curve at an incident angle of 0 degrees, an average transmittance $T_{450-550(0deg)AVE}$ at a wavelength of 450 nm to 550 nm is 85% or more (i-2) in a spectral transmittance curve at an incident angle of 50 degrees, an average transmittance $T_{450-550(50deg)AVE}$ at a wavelength of 450 nm to 550 nm is 85% or more (i-3) in a spectral transmittance curve at an incident angle of 0 degrees, an average transmittance $T_{750-1000(0deg)AVE}$ at a wavelength of 750 nm to 1,000 nm is 2.5% or less (i-4) in a spectral transmittance curve at an incident angle of 50 degrees, an average transmittance $T_{750-1000(50deg)AVE}$ at a wavelength of 750 nm to 1,000 nm is 2.5% or less.

[3] The optical filter according to [1], further satisfying the following spectral characteristics (i-5) to (i-8):

(i-5) when a second dielectric multilayer film side is set as an incident direction, an average reflectance $R2_{750-1000(5deg)AVE}$ at a wavelength of 750 nm to 1,000 nm in a spectral reflectance curve at an incident angle of 5 degrees is 3% or less (i-6) when a second dielectric multilayer film side is set as an incident direction, an average reflectance $R2_{450-600(5deg)AVE}$ at a wavelength of 450 nm to 600 nm in a spectral reflectance curve at an incident angle of 5 degrees is 3% or less (i-7) when a second dielectric multilayer film side is set as an incident direction, an average reflectance $R2_{750-1000(50deg)AVE}$ at a wavelength of 750 nm to 1,000 nm in a spectral reflectance curve at an incident angle of 50 degrees is 5% or less (i-8) when a second dielectric multilayer film side is set as an incident direction, an average reflectance $R2_{450-600(50deg)AVE}$ at a wavelength of 450 nm to 600 nm in a spectral reflectance curve at an incident angle of 50 degrees is 5% or less.

[4] The optical filter according to any one of [1] to [3], further satisfying the following spectral characteristics (i-9) to (i-12):

(i-9) in a spectral transmittance curve at an incident angle of 0 degrees, an average transmittance $T_{1000-1200(0deg)AVE}$ at a wavelength of 1,000 nm to 1,200 nm is 7% or less (i-10) in a spectral transmittance curve at an incident angle of 50 degrees, an average transmittance $T_{1000-1200(50deg)AVE}$ at a wavelength of 1,000 nm to 1,200 nm is 7% or less (i-11) in a spectral transmittance curve at an incident angle of 0 degrees, a wavelength $IR30_{(0deg)}$ at which a transmittance is 30% is in a wavelength range of 630 nm to 680 nm (i-12) in a spectral transmittance curve at an incident angle of 50 degrees, a wavelength $IR30_{(50deg)}$ at which a transmittance is 30% is in a wavelength range of 630 nm to 680 nm.

[5] The optical filter according to according to any one of [1], [3], and [4], in which the first dielectric multilayer film includes at least one $H_1$ layer satisfying a refractive index of 1.8 or more and 2.5 or less and a QWOT of 1.1 or more and 3.5 or less, and when a layer closest to the resin film in the $H_1$ layers is defined as a first $H_1$ layer, the first dielectric multilayer film includes a first $M_1$ layer including a single layer satisfying a QWOT of 1.2 or more and 1.8 or less or a plurality of layers satisfying a total QWOT of 1.2 or more and 1.8 or less between the first $H_1$ layer and the resin film.

[6] The optical filter according to [2], in which the second dielectric multilayer film includes at least one $H_2$ layer satisfying a refractive index of 1.8 or more and 2.5 or less and a QWOT of 1.1 or more and 3.5 or less, and when a layer closest to the phosphate glass in the $H_2$ layers is defined as a first $H_2$ layer, the second dielectric multilayer film includes a first $M_2$ layer including a single layer satisfying a QWOT of 1.2 or more and 1.8 or less or a plurality of layers satisfying a total QWOT of 1.2 or more and 1.8 or less between the first $H_2$ layer and the phosphate glass.

[7] The optical filter according to [5], further satisfying the following spectral characteristics (i-13) to (i-16):

(i-13) when a first dielectric multilayer film side is set as an incident direction, an average reflectance $R1_{750-1000(5deg)AVE}$ at a wavelength of 750 nm to 1,000 nm in a spectral reflectance curve at an incident angle of 5 degrees is 3% or less (i-14) when a first dielectric multilayer film side is set as an incident direction, an average reflectance $R1_{450-600(5deg)AVE}$ at a wavelength of 450 nm to 600 nm in a spectral reflectance curve at an incident angle of 5 degrees is 3% or less (i-15) when a first dielectric multilayer film side is set as an incident direction, an average reflectance $R1_{750-1000(50deg)AVE}$ at a wavelength of 750 nm to 1,000 nm in a spectral reflectance curve at an incident angle of 50 degrees is 5% or less (i-16) when a first dielectric multilayer film side is set as an incident direction, an average reflectance $R1_{450-600(50deg)AVE}$ at a wavelength of 450 nm to 600 nm in a spectral reflectance curve at an incident angle of 50 degrees is 5% or less.

[8] The optical filter according to according to any one of [1] to [7], further satisfying the following spectral characteristics (i-17) to (i-20):

(i-17) an absolute value of a difference between the average transmittance $T_{450-550(0deg)AVE}$ and the average transmittance $T_{450-550(50deg)AVE}$ is 3.5% or less (i-18) an absolute value of a difference between the average transmittance $T_{750-1000(0deg)AVE}$ and the average transmittance $T_{750-1000(50deg)AVE}$ is 1.5% or less (i-19) an absolute value of a difference between an average transmittance $T_{1000-1200(0deg)AVE}$ at a wavelength of 1,000 nm to 1,200 nm in a spectral transmittance curve at an incident angle of 0 degrees and an average transmittance $T_{1000-1200(50deg)AVE}$ at a wavelength of 1,000 nm to 1,200 nm in a spectral transmittance curve at an incident angle of 50 degrees is 1.5% or less (i-20) an absolute value of a difference between a wavelength $IR30_{(0deg)}$ at which a transmittance is 30% in a spectral transmittance curve at an incident angle of 0 degrees and a wavelength $IR30_{(50deg)}$ at which a transmittance is 30% in a spectral transmittance curve at an incident angle of 50 degrees is 15 nm or less.

[9] The optical filter according to according to any one of [1] to [8], further satisfying the following spectral characteristic (i-21):

(i-21) when a second dielectric multilayer film side is set as an incident direction, an average of an absorption loss amount defined below in a wavelength range of 750 nm to 1,000 nm is 95% or more:

(absorption loss amount) [%]=100−(transmittance at incident angle of 5 degrees)−(reflectance at incident angle of 5 degrees).

[10] The optical filter according to according to any one of [1] to [9], further satisfying the following spectral characteristic (i-22):

(i-22) when a second dielectric multilayer film side is set as an incident direction, a minimum value of an absorption loss amount defined below in a wavelength range of 750 nm to 1,000 nm is 90% or more:

(absorption loss amount) [%]=100−(transmittance at incident angle of 5 degrees)−(reflectance at incident angle of 5 degrees).

[11] The optical filter according to according to any one of [1] to [10], further satisfying the following spectral characteristic (i-23):

(i-23) when a second dielectric multilayer film side is set as an incident direction, when a reflectance $R2_{n(5deg)}$ (n: any integer) at each wavelength is read at an interval of 1 nm from a wavelength of 750 nm to a wavelength of 1,000 nm in a spectral reflectance curve at an incident angle of 5 degrees, the number of n at which the reflectance $R2_{n(5deg)}$ is 1% or less is 200 or more.

[12] The optical filter according to according to any one of [5] to [11], further satisfying the following spectral characteristic (i-24):

(i-24) when a first dielectric multilayer film side is set as an incident direction, when a reflectance $R1_{n(5deg)}$ (n: any integer) at each wavelength is read at an interval of 1 nm from a wavelength of 750 nm to a wavelength of 1,000 nm in a spectral reflectance curve at an incident angle of 5 degrees, the number of n at which the reflectance $R1_{n(5deg)}$ is 1% or less is 150 or more.

[13] The optical filter according to according to any one of [1], [3] to [5], and [7] to [12], in which the second dielectric multilayer film includes two or more of the $H_2$ layers, and when a layer second closest to the phosphate glass in the $H_2$ layers is defined as a second $H_2$ layer, the second dielectric multilayer film includes a second $M_2$ layer including a single layer satisfying a QWOT of 1.2 or more and 2.1 or less or a plurality of layers satisfying a total QWOT of 1.2 or more and 2.1 or less between the first $H_2$ layer and the second $H_2$ layer.

[14] The optical filter according to [13], in which the second dielectric multilayer film includes a third $M_2$ layer including a single layer satisfying a QWOT of 1.2 or more and 2.1 or less or a plurality of layers satisfying a total QWOT of 1.2 or more and 2.1 or less between the first $H_2$ layer and the second $M_2$ layer.

[15] The optical filter according to according to any one of [1] to [14], in which the phosphate glass satisfies all of the following spectral characteristics (ii-1) to (ii-5):

(ii-1) an internal transmittance $T_{450}$ at a wavelength of 450 nm is 92% or more (ii-2) an average internal transmittance $T_{450-600AVE}$ at a wavelength of 450 nm to 600 nm is 90% or more (ii-3) a wavelength IR50 at which an internal transmittance is 50% is in a wavelength range of 625 nm to 650 nm (ii-4) an average internal transmittance $T_{750-1000AVE}$ at a wavelength of 750 nm to 1,000 nm is 2.5% or less (ii-5) an average internal transmittance $T_{1000-1200AVE}$ at a wavelength of 1,000 nm to 1,200 nm is 7% or less.

[16] The optical filter according to according to any one of [1] to [15], in which the resin film satisfies all of the following spectral characteristics (iii-1) to (iii-3):

(iii-1) an internal transmittance $T_{450}$ at a wavelength of 450 nm is 85% or more (iii-2) an average internal transmittance $T_{450-600AVE}$ at a wavelength of 450 nm to 600 nm is 90% or more (iii-3) a wavelength IR50 at which an internal transmittance is 50% is in a wavelength range of 660 nm to 700 nm.

[17] The optical filter according to according to any one of [1] to [16], in which the phosphate glass has a composition including, in terms of mass percentage based on oxide, 40% to 80% of $P_2O_5$, 0.5% to 20% of $Al_2O_3$, 0.5% to 20% of $\Sigma R_2O$, where $R_2O$ is one or more components selected from $Li_2O$, $Na_2O$, $K_2O$, $Rb_2O$, and $Cs_2O$, and $\Sigma R_2O$ is a total content of $R_2O$, 0% to 40% of $\Sigma R'O$, where R'O is one or more components selected from CaO, MgO, BaO, SrO, and ZnO, and $\Sigma R'O$ is a total content of R'O, and 0.5% to 40% of CuO.

[18] The optical filter according to according to any one of [1] to [17], in which the resin film has a thickness of 10 μm or less.

EXAMPLES

Next, the present invention is described more specifically with reference to examples.

For measurement of each spectral characteristic, an ultraviolet-visible spectrophotometer (UH-4150 type, manufactured by Hitachi High-Tech Corporation) was used.

The spectral characteristic in the case where an incident angle is not particularly specified is a value measured at an incident angle of 0 degrees (in a direction perpendicular to a main surface of the optical filter).

Dyes used in respective examples are as follows.

Compound 1 (squarylium compound): synthesized based on WO2017/135359.

Compound 2 (merocyanine compound): synthesized based on the description of German Patent No. 10109243.

Compound 3 (cyanine compound): synthesized based on a method described in Dyes and Pigments, 73, 344 to 352 (2007).

Compound 4 (squarylium compound): synthesized based on a method disclosed in JP2017-110209A.

[Chem. 1]

COMPOUND 1

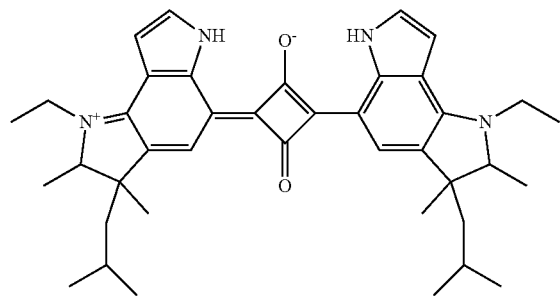

COMPOUND 2

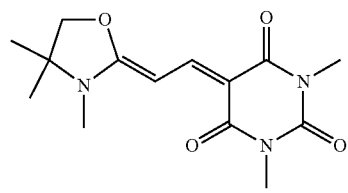

COMPOUND 3

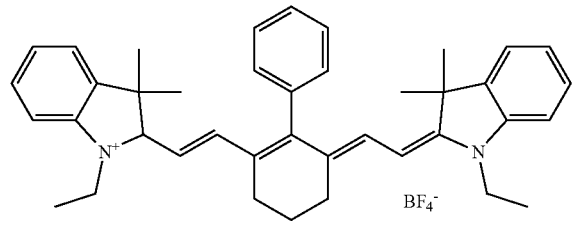

COMPOUND 4

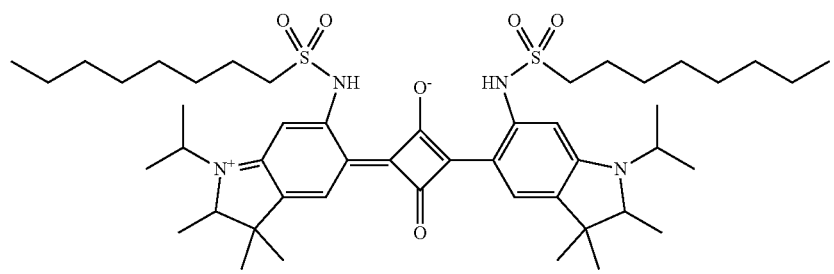

With respect to the obtained coating film, a spectral transmittance curve in a wavelength range of 350 nm to 1,200 nm was measured using the ultraviolet-visible spectrophotometer.

The spectral characteristics in the polyimide resin of the above respective compounds 1 to 4 are shown in the following table. The spectral characteristics shown in the following table were evaluated in terms of internal trans- <Spectral Characteristics of Dye in Resin>

A polyimide resin ("C3G30G" (trade name), manufactured by Mitsubishi Gas Chemical Company, Inc., refractive index: 1.59) was dissolved in a mixture of γ-butyrolactone (GBL):cyclohexanone=1:1 (mass ratio) to prepare a polyimide resin solution having a resin concentration of 8.5 mass %.

Each of the dyes of the above respective compounds 1 to 4 was added to the resin solution at a concentration of 7.5 parts by mass with respect to 100 parts by mass of the resin, and stirred and dissolved at 50° C. for 2 hours to obtain a coating solution. The obtained coating solution was applied to an alkaline glass (D263 glass, manufactured by SCHOTT, thickness: 0.2 mm) by a spin coating method to form a coating film having a film thickness of about 1.0 μm.

mittance in order to avoid an influence of reflection at an air interface and a glass interface.

TABLE 1

| Dye number | Maximum absorption wavelength in resin | Type of dye |
|---|---|---|
| Compound 1 | 752 nm | Squarylium |
| Compound 2 | 400 nm | Merocyanine |
| Compound 3 | 773 nm | Cyanine |
| Compound 4 | 707 nm | Squarylium |

Examples 1-1 and 1-2: Spectral Characteristics of Resin Film

Any of the dyes of the compounds 1 to 4 was mixed with a polyimide resin solution (C3G30G, manufactured by Mitsubishi Gas Chemical Company, Inc.) prepared in the same manner as in calculation of the spectral characteristics of the above compounds at a concentration shown in the following table, and stirred and dissolved at 50° C. for 2 hours to obtain a resin solution. The obtained resin solution was applied to an alkaline glass (D263 glass, manufactured by SCHOTT, thickness: 0.2 mm) by a spin coating method to form a resin film having a film thickness of 1.0 μm.

With respect to the obtained resin film, a spectral transmittance curve in the wavelength range of 350 nm to 1,200 nm was measured using the ultraviolet-visible spectrophotometer.

The obtained spectral characteristics are shown in the following table. The spectral characteristics shown in the following table were evaluated in terms of internal transmittance in order to avoid an influence of reflection at an air interface and a glass interface.

Examples 1-1 and 1-2 are reference examples.

TABLE 2

| | | Example 1-1 | Example 1-2 |
|---|---|---|---|
| Added amount of dye (wt %) | Compound 1 | 2.33 | 0 |
| | Compound 2 | 6.08 | 3.07 |
| | Compound 3 | 2.56 | 0 |
| | Compound 4 | 0 | 7.06 |
| | Total | 10.97 | 10.13 |
| Resin film thickness (μm) | | 1 | 1 |
| Internal transmittance | 450-600 nm average internal transmittance (%) | 95.9 | 96.4 |
| | 450 nm internal transmittance (%) | 90.9 | 92.9 |
| | IR50 (nm) | 680 | 649 |

<Spectral Characteristics of Glass>

As the phosphate glass, a phosphate glass 1 and a phosphate glass 2 were prepared by the following procedure.

Raw materials were weighed and mixed so as to have the compositions (mass % based on oxide) shown in the following table, and the mixture was put into a crucible having an internal volume of about 400 cc and melted in an air atmosphere for 2 hours. Thereafter, the mixture was refined, stirred, and cast into a rectangular mold having a length of 100 mm, a width of 80 mm, and a height of 20 mm that was preheated to about 300° C. to 500° C., and then slowly cooled at about 1° C./min to obtain plate-like glass having a plate shape of a length of 40 mm, a width of 30 mm, and a thickness of a value shown in Table 4, both surfaces of which were optically polished.

NF50T manufactured by AGC was prepared as a fluorophosphate glass 1 and a fluorophosphate glass 2. Thicknesses of the fluorophosphate glass 1 and the fluorophosphate glass 2 are shown in Table 4, respectively.

TABLE 3

| | | Phosphate glass 1 | Phosphate glass 2 |
|---|---|---|---|
| Composition [mass %] | $P_2O_5$ | 68 | 70 |
| | $Al_2O_3$ | 11 | 13 |
| | $Li_2O$ | 0 | 1 |
| | $Na_2O$ | 3 | 1 |
| | $K_2O$ | 6 | 0 |
| | $Rb_2O$ | 0 | 0 |
| | $Cs_2O$ | 0 | 0 |
| | CaO | 0 | 0 |
| | SrO | 0 | 0 |
| | MgO | 4 | 1 |
| | BaO | 0 | 3 |
| | ZnO | 0 | 5 |
| | CuO | 8 | 6 |
| | F | 0 | 0 |

With respect to each glass, a spectral transmittance curve in the wavelength range of 350 nm to 1,200 nm was measured using the ultraviolet-visible spectrophotometer.

The obtained results of the spectral characteristics are shown in the following table. The spectral characteristics shown in the following table were evaluated in terms of internal transmittance in order to avoid an influence of reflection at an air interface and a glass interface. The obtained results are shown in the following table.

A haze of each glass was determined based on JIS K 7136 using an automatic haze meter (model number: TC-HII-IDPK, manufactured by TokyoDenshoku.co., Ltd.).

Spectral transmittance curves of the phosphate glass 1 and the fluorophosphate glass 1 are illustrated in FIG. 5.

TABLE 4

| Glass | Type | Phosphate glass 1 | Phosphate glass 2 | Fluorophosphate glass 1 | Fluorophosphate glass 2 |
|---|---|---|---|---|---|
| | Thickness (mm) | 0.28 | 0.35 | 0.28 | 0.40 |
| Spectral characteristics | Haze | 0.1 or less | 0.1 or less | 0.1 or less | 0.1 or less |
| | 450 nm internal transmittance (%) | 94.64 | 95.71 | 98.07 | 97.34 |
| | 450-600 nm average internal transmittance (%) | 92.09 | 92.36 | 94.11 | 92.08 |
| | IR50 (nm) | 634 | 629 | 638 | 622 |
| | 750-1,000 nm average internal transmittance (%) | 0.84 | 1.88 | 5.70 | 1.94 |
| | 1,000-1,200 nm average internal transmittance (%) | 2.21 | 6.39 | 16.90 | 8.86 |

Based on the above results, it was found that the phosphate glass 1 and the phosphate glass 2 having specific glass compositions had a higher transmittance in the visible light region and higher light-shielding properties in the near-infrared light region as compared to the fluorophosphate glass 1 and the fluorophosphate glass 2. Further, the phosphate glass 1 and the phosphate glass 2 having specific glass compositions had low hazes.

On the other hand, the fluorophosphate glass 1 and the fluorophosphate glass 2 maintained a high visible transmittance, but were inferior in near-infrared light-shielding properties. In addition, as a result of increasing a plate thickness of the glass in order to enhance the light-shielding properties, the wavelength IR50 did not satisfy desired spectral characteristics on a short wavelength side.

Examples 2-1 to 2-8: Configuration of Optical Filter

Example 2-1

On one main surface of the above phosphate glass 1 (thickness: 0.28 mm), films were formed in order from the first layer by vapor deposition such that each layer had a film material and a film thickness (nm) shown in the following table, thereby forming a second dielectric multilayer film of eight layers in total. Hereinafter, a dielectric multilayer film having a configuration in Table 5 is referred to as a "dielectric multilayer film 1".

TABLE 5

| Dielectric multilayer film 1 | | | | |
|---|---|---|---|---|
| Layer configuration | Material | Physical film thickness [nm] | QWOT | H layer/ M layer |
| 1st layer | TiO$_2$ | 10.69 | 0.211 | First M layer |
| 2nd layer | SiO$_2$ | 49.92 | 0.592 | (QWOT: 1.662) |
| 3rd layer | TiO$_2$ | 31.42 | 0.620 | |
| 4th layer | SiO$_2$ | 20.07 | 0.238 | |
| 5th layer | TiO$_2$ | 79.5 | 1.569 | First H layer |
| 6th layer | SiO$_2$ | 17.81 | 0.211 | |
| 7th layer | TiO$_2$ | 29.93 | 0.591 | |
| 8th layer | SiO$_2$ | 108.01 | 1.282 | |

A resin film was formed on a main surface of the phosphate glass 1 in the same manner as in Example 1-1. Next, the dielectric multilayer film 1 was formed on a surface of the resin film by vapor deposition as the first dielectric multilayer film, thereby obtaining an optical filter of Example 2-1. A configuration of the optical filter of Example 2-1 is shown in Table 10 and FIG. 2.

In the case where the dielectric multilayer film 1 is formed as the second dielectric multilayer film, a column of H layer/M layer in Table 5 is considered to be H$_2$ layer/M$_2$ layer, and in the case where the dielectric multilayer film 1 is formed as the first dielectric multilayer film, the column of H layer/M layer in Table 5 is considered to be H$_1$ layer/M$_1$ layer. The same applies to the following table.

Example 2-2

An optical filter was prepared in the same manner as in Example 2-1 except that dielectric multilayer films having configurations shown in the following table were formed as the first dielectric multilayer film and the second dielectric multilayer film. Hereinafter, the dielectric multilayer film having the configuration shown in Table 6 is referred to as a "dielectric multilayer film 2". A configuration of the optical filter of Example 2-2 is shown in Table 10 and FIG. 3.

TABLE 6

| Dielectric multilayer film 2 | | | | |
|---|---|---|---|---|
| Layer configuration | Material | Physical film thickness [nm] | QWOT | H layer/M layer |
| 1st layer | TiO$_2$ | 10.3 | 0.203 | First M layer |
| 2nd layer | SiO$_2$ | 52.25 | 0.620 | (QWOT: 1.670) |
| 3rd layer | TiO$_2$ | 29.42 | 0.581 | |
| 4th layer | SiO$_2$ | 22.4 | 0.266 | |
| 5th layer | TiO$_2$ | 161.36 | 3.185 | First H layer |
| 6th layer | SiO$_2$ | 9.95 | 0.118 | Second M layer |
| 7th layer | TiO$_2$ | 54.97 | 1.085 | (QWOT: 1.288) |
| 8th layer | SiO$_2$ | 7.16 | 0.085 | |
| 9th layer | TiO$_2$ | 88.78 | 1.752 | Second H layer |
| 10th layer | SiO$_2$ | 18.95 | 0.225 | |
| 11th layer | TiO$_2$ | 29.73 | 0.587 | |
| 12th layer | SiO$_2$ | 110.1 | 1.306 | |

Example 2-3

An optical filter was prepared in the same manner as in Example 2-1 except that dielectric multilayer films having configurations shown in the following table were formed as the first dielectric multilayer film and the second dielectric multilayer film. Hereinafter, the dielectric multilayer film having the configuration shown in Table 7 is referred to as a "dielectric multilayer film 3". A configuration of the optical filter of Example 2-3 is shown in Table 10 and FIG. 4.

TABLE 7

| Dielectric multilayer film 3 | | | | |
|---|---|---|---|---|
| Layer configuration | Material | Physical film thickness [nm] | QWOT | H layer/ M layer |
| 1st layer | MgF$_2$ | 34.94 | 0.386 | |
| 2nd layer | TiO$_2$ | 4.9 | 0.097 | |
| 3rd layer | SiO$_2$ | 99.25 | 1.178 | |
| 4th layer | TiO$_2$ | 9.49 | 0.187 | First M layer |
| 5th layer | SiO$_2$ | 40.08 | 0.476 | (QWOT: 1.773) |
| 6th layer | TiO$_2$ | 8.25 | 0.163 | |
| 7th layer | SiO$_2$ | 23.17 | 0.275 | |
| 8th layer | TiO$_2$ | 25.32 | 0.500 | |
| 9th layer | SiO$_2$ | 14.56 | 0.173 | |
| 10th layer | TiO$_2$ | 117.33 | 2.316 | First H layer |
| 11th layer | SiO$_2$ | 24.32 | 0.289 | Third M layer |
| 12th layer | TiO$_2$ | 27.95 | 0.552 | (QWOT: 1.674) |
| 13th layer | SiO$_2$ | 70.3 | 0.834 | |
| 14th layer | TiO$_2$ | 17.7 | 0.349 | Second M layer |
| 15th layer | SiO$_2$ | 66.91 | 0.794 | (QWOT: 2.030) |
| 16th layer | TiO$_2$ | 32.16 | 0.635 | |
| 17th layer | SiO$_2$ | 21.2 | 0.252 | |
| 18th layer | TiO$_2$ | 87.69 | 1.731 | Second H layer |
| 19th layer | SiO$_2$ | 23.82 | 0.283 | |
| 20th layer | TiO$_2$ | 25.37 | 0.501 | |
| 21st layer | MgF$_2$ | 121.91 | 1.346 | |

Example 2-4

An optical filter was prepared in the same manner as in Example 2-1 except that a dielectric multilayer film having a configuration shown in the following table was formed as the first dielectric multilayer film. Hereinafter, the dielectric multilayer film having the configuration shown in Table 8 is referred to as a "dielectric multilayer film 4". A configuration of the optical filter of Example 2-4 is shown in Table 10.

TABLE 8

| | | Dielectric multilayer film 4 | | |
|---|---|---|---|---|
| Layer configuration | Material | Physical film thickness [nm] | QWOT | H layer/ M layer |
| 1st layer | TiO$_2$ | 14.41 | 0.284 | |
| 2nd layer | SiO$_2$ | 33.14 | 0.393 | |
| 3rd layer | TiO$_2$ | 56.82 | 1.122 | First H layer |
| 4th layer | SiO$_2$ | 10.03 | 0.119 | |
| 5th layer | TiO$_2$ | 39.6 | 0.782 | |
| 6th layer | SiO$_2$ | 94.44 | 1.121 | |

Example 2-5

An optical filter was prepared in the same manner as in Example 2-4 except that the dielectric multilayer film 4 was formed as the second dielectric multilayer film. A configuration of the optical filter of Example 2-5 is shown in Table 11.

Example 2-6

An optical filter was prepared in the same manner as in Example 2-4 except that the fluorophosphate glass 1 was used as the phosphate glass, the resin film of Example 1-2 was formed as the resin film, and a dielectric multilayer film having a configuration shown in the following table was formed as the second dielectric multilayer film. Hereinafter, the dielectric multilayer film having the configuration shown in Table 9 is referred to as a "dielectric multilayer film 5". A configuration of the optical filter of Example 2-6 is shown in Table 11.

TABLE 9

| | | Dielectric multilayer film 5 | | |
|---|---|---|---|---|
| Layer configuration | Material | Physical film thickness [nm] | QWOT | H layer/ M layer |
| 1st layer | TiO$_2$ | 13.45 | 0.265 | |
| 2nd layer | SiO$_2$ | 37.02 | 0.439 | |
| 3rd layer | TiO$_2$ | 115.97 | 2.289 | First H layer |
| 4th layer | SiO$_2$ | 181.66 | 2.155 | |
| 5th layer | TiO$_2$ | 108.92 | 2.150 | Second H layer |
| 6th layer | SiO$_2$ | 184.56 | 2.190 | |
| 7th layer | TiO$_2$ | 110.81 | 2.187 | H layer |
| 8th layer | SiO$_2$ | 186.26 | 2.210 | |
| 9th layer | TiO$_2$ | 108.56 | 2.143 | H layer |
| 10th layer | SiO$_2$ | 184.11 | 2.185 | |
| 11th layer | TiO$_2$ | 110.1 | 2.173 | H layer |
| 12th layer | SiO$_2$ | 180.99 | 2.147 | |
| 13th layer | TiO$_2$ | 106.56 | 2.103 | H layer |
| 14th layer | SiO$_2$ | 180.34 | 2.140 | |
| 15th layer | TiO$_2$ | 106.55 | 2.103 | H layer |
| 16th layer | SiO$_2$ | 172.01 | 2.041 | |
| 17th layer | TiO$_2$ | 95.45 | 1.884 | H layer |
| 18th layer | SiO$_2$ | 157.6 | 1.870 | |
| 19th layer | TiO$_2$ | 89.83 | 1.773 | H layer |
| 20th layer | SiO$_2$ | 155.01 | 1.839 | |
| 21st layer | TiO$_2$ | 90.55 | 1.787 | H layer |
| 22nd layer | SiO$_2$ | 168.02 | 1.994 | |
| 23rd layer | TiO$_2$ | 102.33 | 2.020 | H layer |
| 24th layer | SiO$_2$ | 175.6 | 2.084 | |
| 25th layer | TiO$_2$ | 97.56 | 1.926 | H layer |
| 26th layer | SiO$_2$ | 156 | 1.851 | |
| 27th layer | TiO$_2$ | 88.01 | 1.737 | H layer |
| 28th layer | SiO$_2$ | 149.34 | 1.772 | |

TABLE 9-continued

| | | Dielectric multilayer film 5 | | |
|---|---|---|---|---|
| Layer configuration | Material | Physical film thickness [nm] | QWOT | H layer/ M layer |
| 29th layer | TiO$_2$ | 84.39 | 1.666 | H layer |
| 30th layer | SiO$_2$ | 145.07 | 1.721 | |
| 31st layer | TiO$_2$ | 83.75 | 1.653 | H layer |
| 32nd layer | SiO$_2$ | 145.87 | 1.731 | |
| 33rd layer | TiO$_2$ | 85.29 | 1.683 | H layer |
| 34th layer | SiO$_2$ | 143.21 | 1.699 | |
| 35th layer | TiO$_2$ | 83.7 | 1.652 | H layer |
| 36th layer | SiO$_2$ | 147.86 | 1.754 | |
| 37th layer | TiO$_2$ | 87.06 | 1.718 | H layer |
| 38th layer | SiO$_2$ | 150.17 | 1.782 | |
| 39th layer | TiO$_2$ | 82.53 | 1.629 | H layer |
| 40th layer | SiO$_2$ | 70.51 | 0.837 | |

Example 2-7

An optical filter was prepared in the same manner as in Example 2-6 except that the dielectric multilayer film 1 was formed as the first dielectric multilayer film. A configuration of the optical filter of Example 2-7 is shown in Table 11.

Example 2-8

An optical filter was prepared in the same manner as in Example 2-1 except that the fluorophosphate glass was used as the phosphate glass. A configuration of the optical filter of Example 2-8 is shown in Table 11.

Examples 2-1 to 2-8: Spectral Characteristics of Optical Filter

With respect to the optical filters of Examples 2-1 to 2-8 described above, spectral transmittance curves at an incident angle of 0 degrees and an incident angle of 50 degrees and spectral reflectance curves at an incident angle of 5 degrees and an incident angle of 50 degrees in a wavelength range of 350 nm to 1,200 nm were measured using an ultraviolet-visible spectrophotometer. In the measurement of the spectral reflectance curves, a "front surface" is shown in the case where the second dielectric multilayer film side is set as the incident direction, and a "rear surface" is shown in the case where the first dielectric multilayer film side is set as the incident direction.

Respective characteristics shown in the following tables were calculated based on the obtained data of the spectral characteristics.

Spectral transmittance curves (at incident angles of 0 degrees and 50 degrees) of the optical filters of Examples 2-1, 2-4, 2-5, and 2-6 and reflectance curves (at incident angles of 5 degrees and 50 degrees) when the second dielectric multilayer film side is set as the incident direction are illustrated in FIGS. 6 to 13.

Examples 2-1 to 2-4 are inventive examples, and Examples 2-5 to 2-8 are comparative examples.

TABLE 10

|  |  |  | Example 2-1 | Example 2-2 | Example 2-3 | Example 2-4 |
|---|---|---|---|---|---|---|
|  | Configuration of optical filter | First dielectric multilayer film | Dielectric multilayer film 1 | Dielectric multilayer film 2 | Dielectric multilayer film 3 | Dielectric multilayer film 4 |
|  |  | Resin Glass | Example 1-1 Phosphate glass 1 | Example 1-1 Phosphate glass 1 | Example 1-1 Phosphate glass 1 | Example 1-1 Phosphate glass 1 |
|  |  | Second dielectric multilayer film | Dielectric multilayer film 1 | Dielectric multilayer film 2 | Dielectric multilayer film 3 | Dielectric multilayer film 1 |
| Transmittance | 1,000-1,200 nm average transmittance (%) | Incident at 0 deg | 2.1 | 1.9 | 2.1 | 1.9 |
|  | 750-1,000 nm average transmittance (%) |  | 0.5 | 0.5 | 0.5 | 0.5 |
|  | IR30 (nm) |  | 653.0 | 653.0 | 653.0 | 653.0 |
|  | 450-550 nm average transmittance (%) |  | 93.2 | 93.3 | 93.7 | 93.5 |
|  | 750-1,000 nm maximum transmittance (%) |  | 0.8 | 0.8 | 0.8 | 0.7 |
|  | 1,000-1,200 nm maximum transmittance (%) |  | 4.2 | 3.8 | 3.9 | 3.8 |
|  | 450-550 nm minimum transmittance (%) |  | 87.7 | 87.1 | 88.0 | 87.9 |
|  | 450-550 nm maximum transmittance (%) |  | 95.1 | 94.4 | 94.9 | 95.0 |
|  | 1,000-1,200 nm average transmittance (%) | Incident at 50 deg | 1.0 | 0.9 | 0.9 | 0.9 |
|  | 750-1,000 nm average transmittance (%) |  | 0.2 | 0.2 | 0.2 | 0.2 |
|  | IR30 (nm) |  | 644.0 | 645.0 | 646.0 | 645.0 |
|  | 450-550 nm average transmittance (%) |  | 90.2 | 90.3 | 91.3 | 90.3 |
|  | 1,000-1,200 nm average transmittance (%) | 50 deg to 0 deg | 1.0 | 1.0 | 1.2 | 0.9 |
|  | 750-1,000 nm average transmittance (%) |  | 0.3 | 0.3 | 0.3 | 0.3 |
|  | IR30 (nm) |  | 9.0 | 8.0 | 7.0 | 8.0 |
|  | 450-550 nm average transmittance (%) |  | 3.0 | 3.0 | 2.4 | 3.2 |
| Front surface reflectance | 750-1,000 nm average reflectance (%) | Incident at 5 deg | 0.7 | 0.7 | 0.2 | 0.7 |
|  | 450-600 nm average reflectance at (%) |  | 1.2 | 1.1 | 0.7 | 0.9 |
|  | 750-1,000 nm average reflectance (%) | Incident at 50 deg | 3.0 | 3.3 | 1.5 | 3.0 |
|  | 450-600 nm average reflectance (%) |  | 3.4 | 3.4 | 2.2 | 3.3 |
|  | The number of wavelength where reflectance at 750-1,000 nm is 1% or less | Incident at 5 deg | 226.0 | 241.0 | 251.0 | 226.0 |
| Rear surface reflectance | 750-1,000 nm average reflectance (%) | Incident at 5 deg | 0.8 | 0.8 | 0.2 | 6.0 |
|  | 450-600 nm average reflectance (%) |  | 1.2 | 1.1 | 0.7 | 0.8 |
|  | 750-1,000 nm average reflectance (%) | Incident at 50 deg | 3.2 | 3.8 | 1.8 | 12.2 |
|  | 450 nm to 600 nm average reflectance (%) |  | 3.5 | 3.4 | 2.2 | 3.2 |
|  | The number of wavelength where reflectance at 750-1,000 nm is 1% or less | Incident at 5 deg | 178.0 | 185.0 | 251.0 | 0.0 |
| Absorption loss amount | 750-1,000 nm minimum value of absorption loss amount (%) | 100-T5-F5 | 97.9 | 98.0 | 99.2 | 97.9 |
|  | 750-1,000 nm average of absorption loss amount (%) |  | 98.9 | 98.8 | 99.4 | 98.9 |

TABLE 11

|  |  |  | Example 2-5 | Example 2-6 | Example 2-7 | Example 2-8 |
|---|---|---|---|---|---|---|
|  | Configuration of optical filter | First dielectric multilayer film | Dielectric multilayer film 4 | Dielectric multilayer film 4 | Dielectric multilayer film 1 | Dielectric multilayer film 1 |
|  |  | Resin Glass | Example 1-1 Phosphate glass 1 | Example 1-2 Fluorophosphate glass 1 | Example 1-2 Fluorophosphate glass 1 | Example 1-2 Fluorophosphate glass 1 |
|  |  | Second dielectric multilayer film | Dielectric multilayer film 4 | Dielectric multilayer film 5 | Dielectric multilayer film 5 | Dielectric multilayer film 1 |

TABLE 11-continued

| | | | Example 2-5 | Example 2-6 | Example 2-7 | Example 2-8 |
|---|---|---|---|---|---|---|
| Transmittance | 1,000-1,200 nm average transmittance (%) | Incident at 0 deg | 1.6 | 0.7 | 0.8 | 28.1 |
| | 750-1,000 nm average transmittance (%) | | 0.4 | 0.1 | 0.1 | 14.2 |
| | IR30 (nm) | | 654.0 | 649.0 | 649.0 | 648.0 |
| | 450-550 nm average transmittance (%) | | 93.8 | 95.2 | 94.9 | 95.5 |
| | 750-1,000 nm maximum transmittance (%) | | 0.7 | 0.9 | 0.9 | 19.6 |
| | 1,000-1,200 nm maximum transmittance (%) | | 3.4 | 3.0 | 3.4 | 36.9 |
| | 450-550 nm minimum transmittance (%) | | 88.0 | 91.6 | 91.4 | 91.5 |
| | 450-550 nm maximum transmittance (%) | | 95.3 | 97.6 | 97.4 | 97.0 |
| | 1,000-1,200 nm average transmittance (%) | Incident at 50 deg | 0.8 | 9.4 | 10.1 | 21.0 |
| | 750-1,000 nm average transmittance (%) | | 0.2 | 0.1 | 0.1 | 10.1 |
| | IR30 (nm) | | 645.0 | 628.0 | 628.0 | 641.0 |
| | 450-550 nm average transmittance (%) | | 90.4 | 84.8 | 84.7 | 92.9 |
| | 1,000-1,200 nm average transmittance (%) | 50 deg to 0 deg | 0.8 | 8.7 | 9.3 | 7.1 |
| | 750-1,000 nm average transmittance (%) | | 0.3 | 0.0 | 0.0 | 4.1 |
| | IR30 (nm) | | 9.0 | 21.0 | 21.0 | 7.0 |
| | 450-550 nm average transmittance (%) | | 3.5 | 10.4 | 10.2 | 2.7 |
| Front surface reflectance | 750-1,000 nm average reflectance (%) | Incident at 5 deg | 5.7 | 99.6 | 99.6 | 0.7 |
| | 450-600 nm average reflectance (%) | | 0.5 | 1.3 | 1.6 | 1.2 |
| | 750-1,000 nm average reflectance (%) | Incident at 50 deg | 11.6 | 99.3 | 99.3 | 3.1 |
| | 450-600 nm average reflectance (%) | | 3.2 | 9.1 | 9.3 | 3.5 |
| | The number of wavelength where reflectance at 750-1,000 nm is 1% or less | Incident at 5 deg | 6.0 | 0.0 | 0.0 | 215.0 |
| Rear surface reflectance | 750-1,000 nm average reflectance (%) | Incident at 5 deg | 6.0 | 7.7 | 2.7 | 0.6 |
| | 450-600 nm average reflectance (%) | | 0.5 | 1.2 | 1.6 | 1.2 |
| | 750-1,000 nm average reflectance (%) | Incident at 50 deg | 12.2 | 12.5 | 4.3 | 3.2 |
| | 450-600 nm average reflectance (%) | | 3.2 | 8.6 | 8.9 | 3.5 |
| | The number of wavelength where reflectance at 750-1,000 nm is 1% or less | Incident at 5 deg | 0.0 | 0.0 | 0.0 | 216.0 |
| Absorption loss amount | 750-1,000 nm minimum value of absorption loss amount (%) | 100-T5-F5 | 88.2 | 0.0 | 0.0 | 78.8 |
| | 750-1,000 nm average of absorption loss amount (%) | | 93.9 | 0.4 | 0.4 | 85.2 |

Based on the above results, it is understood that, as compared with Examples 2-5 to 2-8 as comparative examples, the optical filters of Examples 2-1 to 2-4 as inventive examples had a high transmittance in the visible light region and high shielding properties in the near-infrared light region, and a small change in visible light transmittance even at a high incident angle, and thus generation of a ripple was prevented, and generation of stray light was also prevented since a reflectance was small on any incident surface.

On the other hand, the optical filter of Example 2-5 as a comparative example had high reflection characteristics on any incident surface.

The optical filter of Example 2-6 as a comparative example had high reflection characteristics on any incident surface, poor light-shielding properties in the near-infrared light region, and a large absorption loss amount.

The optical filter of Example 2-7 as a comparative example had high reflection characteristics in incidence on a glass surface, poor light-shielding properties in the near-infrared light region, and a large absorption loss amount.

The optical filter of Example 2-8 as a comparative example had poor light-shielding properties in the near-infrared light region.

Although the present invention has been described in detail with reference to specific embodiments, it is apparent to those skilled in the art that various changes and modifications can be made without departing from the spirit and scope of the present invention. The present application is based on a Japanese Patent Application (Japanese Patent Application No. 2022-138361) filed on Aug. 31, 2022, the content of which is incorporated herein by reference.

REFERENCE SIGNS LIST

1B: optical filter
11: phosphate glass
12: resin film
20A: second dielectric multilayer film
20B: first dielectric multilayer film

The invention claimed is:

1. An optical filter comprising a first dielectric multilayer film, a resin film, a phosphate glass, and a second dielectric multilayer film in this order,
wherein the resin film comprises a resin and a dye having a maximum absorption wavelength in 690 nm to 800 nm in the resin, the first dielectric multilayer film and the second dielectric multilayer film each comprises a plurality of layers having different refractive indices, the second dielectric multilayer film comprises at least one $H_2$ layer satisfying a refractive index of 1.8 or more and 2.5 or less and a QWOT of 1.1 or more and 3.5 or less, and when a layer closest to the phosphate glass in the $H_2$ layers is defined as a first $H_2$ layer, the second dielectric multilayer film comprises a first $M_2$ layer comprising a single layer satisfying a QWOT of 1.2 or more and 1.8 or less or a plurality of layers satisfying a total QWOT of 1.2 or more and 1.8 or less between the first $H_2$ layer and the phosphate glass, and the optical filter satisfies all of the following spectral characteristics (i-1) to (i-4):

(i-1) in a spectral transmittance curve at an incident angle of 0 degrees, an average transmittance $T_{450\text{-}550(0deg)AVE}$ at a wavelength of 450 nm to 550 nm is 85% or more (i-2) in a spectral transmittance curve at an incident angle of 50 degrees, an average transmittance $T_{450\text{-}550(50deg)AVE}$ at a wavelength of 450 nm to 550 nm is 85% or more (i-3) in a spectral transmittance curve at an incident angle of 0 degrees, an average transmittance $T_{750\text{-}1000(0deg)AVE}$ at a wavelength of 750 nm to 1,000 nm is 2.5% or less (i-4) in a spectral transmittance curve at an incident angle of 50 degrees, an average transmittance $T_{750\text{-}1000(50deg)AVE}$ at a wavelength of 750 nm to 1,000 nm is 2.5% or less.

2. The optical filter according to claim 1, further satisfying the following spectral characteristics (i-5) to (i-8):

(i-5) when a second dielectric multilayer film side is set as an incident direction, an average reflectance $R2_{750\text{-}1000(5deg)AVE}$ at a wavelength of 750 nm to 1,000 nm in a spectral reflectance curve at an incident angle of 5 degrees is 3% or less (i-6) when a second dielectric multilayer film side is set as an incident direction, an average reflectance $R2_{450\text{-}600(5deg)AVE}$ at a wavelength of 450 nm to 600 nm in a spectral reflectance curve at an incident angle of 5 degrees is 3% or less (i-7) when a second dielectric multilayer film side is set as an incident direction, an average reflectance $R2_{750\text{-}1000(50deg)AVE}$ at a wavelength of 750 nm to 1,000 nm in a spectral reflectance curve at an incident angle of 50 degrees is 5% or less (i-8) when a second dielectric multilayer film side is set as an incident direction, an average reflectance $R2_{450\text{-}600(50deg)AVE}$ at a wavelength of 450 nm to 600 nm in a spectral reflectance curve at an incident angle of 50 degrees is 5% or less.

3. The optical filter according to claim 1, further satisfying the following spectral characteristics (i-9) to (i-12):

(i-9) in a spectral transmittance curve at an incident angle of 0 degrees, an average transmittance $T_{1000\text{-}1200(0deg)AVE}$ at a wavelength of 1,000 nm to 1,200 nm is 7% or less (i-10) in a spectral transmittance curve at an incident angle of 50 degrees, an average transmittance $T_{1000\text{-}1200(50deg)AVE}$ at a wavelength of 1,000 nm to 1,200 nm is 7% or less (i-11) in a spectral transmittance curve at an incident angle of 0 degrees, a wavelength $IR30_{(0deg)}$ at which a transmittance is 30% is in a wavelength range of 630 nm to 680 nm (i-12) in a spectral transmittance curve at an incident angle of 50 degrees, a wavelength $IR30_{(50deg)}$ at which a transmittance is 30% is in a wavelength range of 630 nm to 680 nm.

4. The optical filter according to claim 1, wherein the first dielectric multilayer film comprises at least one $H_1$ layer satisfying a refractive index of 1.8 or more and 2.5 or less and a QWOT of 1.1 or more and 3.5 or less, and when a layer closest to the resin film in the $H_1$ layers is defined as a first $H_1$ layer, the first dielectric multilayer film comprises a first $M_1$ layer comprising a single layer satisfying a QWOT of 1.2 or more and 1.8 or less or a plurality of layers satisfying a total QWOT of 1.2 or more and 1.8 or less between the first $H_1$ layer and the resin film.

5. The optical filter according to claim 1, further satisfying the following spectral characteristics (i-17) to (i-20):

(i-17) an absolute value of a difference between the average transmittance $T_{450\text{-}550(0deg)AVE}$ and the average transmittance $T_{450\text{-}550(50deg)AVE}$ is 3.5% or less (i-18) an absolute value of a difference between the average transmittance $T_{750\text{-}1000(0deg)AVE}$ and the average transmittance $T_{750\text{-}1000(50deg)AVE}$ is 1.5% or less (i-19) an absolute value of a difference between an average transmittance $T_{1000\text{-}1200(0deg)AVE}$ at a wavelength of 1,000 nm to 1,200 nm in a spectral transmittance curve at an incident angle of 0 degrees and an average transmittance $T_{1000\text{-}1200(50deg)AVE}$ at a wavelength of 1,000 nm to 1,200 nm in a spectral transmittance curve at an incident angle of 50 degrees is 1.5% or less (i-20) an absolute value of a difference between a wavelength $IR30_{(0deg)}$ at which a transmittance is 30% in a spectral transmittance curve at an incident angle of 0 degrees and a wavelength $IR30_{(50deg)}$ at which a transmittance is 30% in a spectral transmittance curve at an incident angle of 50 degrees is 15 nm or less.

6. The optical filter according to claim 1, further satisfying the following spectral characteristic (i-21):

(i-21) when a second dielectric multilayer film side is set as an incident direction, an average of an absorption loss amount defined below in a wavelength range of 750 nm to 1,000 nm is 95% or more:

(absorption loss amount) [%]=100−(transmittance at incident angle of 5 degrees)−(reflectance at incident angle of 5 degrees).

7. The optical filter according to claim 1, further satisfying the following spectral characteristic (i-22):

(i-22) when a second dielectric multilayer film side is set as an incident direction, a minimum value of an absorption loss amount defined below in a wavelength range of 750 nm to 1,000 nm is 90% or more:

(absorption loss amount) [%]=100−(transmittance at incident angle of 5 degrees)−(reflectance at incident angle of 5 degrees).

8. The optical filter according to claim 1, further satisfying the following spectral characteristic (i-23):

(i-23) when a second dielectric multilayer film side is set as an incident direction, when a reflectance $R2_{n(5deg)}$ (n: any integer) at each wavelength is read at an interval of 1 nm from a wavelength of 750 nm to a wavelength of 1,000 nm in a spectral reflectance curve at an incident angle of 5 degrees, the number of n at which the reflectance $R2_{n(5deg)}$ is 1% or less is 200 or more.

9. The optical filter according to claim 1,
wherein the second dielectric multilayer film comprises two or more of the $H_2$ layers, and
when a layer second closest to the phosphate glass in the $H_2$ layers is defined as a second $H_2$ layer, the second dielectric multilayer film comprises a second $M_2$ layer comprising a single layer satisfying a QWOT of 1.2 or more and 2.1 or less or a plurality of layers satisfying a total QWOT of 1.2 or more and 2.1 or less between the first $H_2$ layer and the second $H_2$ layer.

10. The optical filter according to claim 9,
wherein the second dielectric multilayer film comprises a third $M_2$ layer comprising a single layer satisfying a QWOT of 1.2 or more and 2.1 or less or a plurality of layers satisfying a total QWOT of 1.2 or more and 2.1 or less between the first $H_2$ layer and the second $M_2$ layer.

11. The optical filter according to claim 1, wherein the phosphate glass satisfies all of the following spectral characteristics (ii-1) to (ii-5):
(ii-1) an internal transmittance $T_{450}$ at a wavelength of 450 nm is 92% or more
(ii-2) an average internal transmittance $T_{450\text{-}600AVE}$ at a wavelength of 450 nm to 600 nm is 90% or more
(ii-3) a wavelength IR50 at which an internal transmittance is 50% is in a wavelength range of 625 nm to 650 nm
(ii-4) an average internal transmittance $T_{750\text{-}1000AVE}$ at a wavelength of 750 nm to 1,000 nm is 2.5% or less
(ii-5) an average internal transmittance $T_{1000\text{-}1200AVE}$ at a wavelength of 1,000 nm to 1,200 nm is 7% or less.

12. The optical filter according to claim 1, wherein the resin film satisfies all of the following spectral characteristics (iii-1) to (iii-3):
(iii-1) an internal transmittance $T_{450}$ at a wavelength of 450 nm is 85% or more
(iii-2) an average internal transmittance $T_{450\text{-}600AVE}$ at a wavelength of 450 nm to 600 nm is 90% or more
(iii-3) a wavelength IR50 at which an internal transmittance is 50% is in a wavelength range of 660 nm to 700 nm.

13. The optical filter according to claim 1, wherein the phosphate glass has a composition comprising, in terms of mass percentage based on oxide,
40% to 80% of $P_2O_5$,
0.5% to 20% of $Al_2O_3$,
0.5% to 20% of $\Sigma R_2O$, where $R_2O$ is one or more components selected from $Li_2O$, $Na_2O$, $K_2O$, $Rb_2O$, and $Cs_2O$, and $\Sigma R_2O$ is a total content of $R_2O$,
0% to 40% of $\Sigma R'O$, where $R'O$ is one or more components selected from CaO, MgO, BaO, SrO, and ZnO, and $\Sigma R'O$ is a total content of $R'O$, and
0.5% to 40% of CuO.

14. The optical filter according to claim 1, wherein the resin film has a thickness of 10 μm or less.

15. An imaging device comprising the optical filter according to claim 1.

16. An optical filter comprising a first dielectric multilayer film, a resin film, a phosphate glass, and a second dielectric multilayer film in this order,
wherein the resin film comprises a resin and a dye having a maximum absorption wavelength in 690 nm to 800 nm in the resin,
the first dielectric multilayer film and the second dielectric multilayer film each comprises a plurality of layers having different refractive indices,
the first dielectric multilayer film comprises at least one $H_1$ layer satisfying a refractive index of 1.8 or more and 2.5 or less and a QWOT of 1.1 or more and 3.5 or less, and
when a layer closest to the resin film in the $H_1$ layers is defined as a first $H_1$ layer,
the first dielectric multilayer film comprises a first $M_1$ layer comprising a single layer satisfying a QWOT of 1.2 or more and 1.8 or less or a plurality of layers satisfying a total QWOT of 1.2 or more and 1.8 or less between the first $H_1$ layer and the resin film, and
the optical filter satisfies all of the following spectral characteristics (i-1) to (i-4):
(i-1) in a spectral transmittance curve at an incident angle of 0 degrees, an average transmittance $T_{450\text{-}550(0deg)AVE}$ at a wavelength of 450 nm to 550 nm is 85% or more
(i-2) in a spectral transmittance curve at an incident angle of 50 degrees, an average transmittance $T_{450\text{-}550(50deg)AVE}$ at a wavelength of 450 nm to 550 nm is 85% or more
(i-3) in a spectral transmittance curve at an incident angle of 0 degrees, an average transmittance $T_{750\text{-}1000(0deg)AVE}$ at a wavelength of 750 nm to 1,000 nm is 2.5% or less
(i-4) in a spectral transmittance curve at an incident angle of 50 degrees, an average transmittance $T_{750\text{-}1000(50deg)AVE}$ at a wavelength of 750 nm to 1,000 nm is 2.5% or less.

17. The optical filter according to claim 16, further satisfying the following spectral characteristics (i-13) to (i-16):
(i-13) when a first dielectric multilayer film side is set as an incident direction, an average reflectance $R1_{750\text{-}1000(5deg)AVE}$ at a wavelength of 750 nm to 1,000 nm in a spectral reflectance curve at an incident angle of 5 degrees is 3% or less
(i-14) when a first dielectric multilayer film side is set as an incident direction, an average reflectance $R1_{450\text{-}600(5deg)AVE}$ at a wavelength of 450 nm to 600 nm in a spectral reflectance curve at an incident angle of 5 degrees is 3% or less
(i-15) when a first dielectric multilayer film side is set as an incident direction, an average reflectance $R1_{750\text{-}1000(50deg)AVE}$ at a wavelength of 750 nm to 1,000 nm in a spectral reflectance curve at an incident angle of 50 degrees is 5% or less
(i-16) when a first dielectric multilayer film side is set as an incident direction, an average reflectance $R1_{450\text{-}600(50deg)AVE}$ at a wavelength of 450 nm to 600 nm in a spectral reflectance curve at an incident angle of 50 degrees is 5% or less.

18. The optical filter according to claim 16, further satisfying the following spectral characteristic (i-24):
(i-24) when a first dielectric multilayer film side is set as an incident direction, when a reflectance $R1_{n(5deg)}$ (n: any integer) at each wavelength is read at an interval of 1 nm from a wavelength of 750 nm to a wavelength of 1,000 nm in a spectral reflectance curve at an incident angle of 5 degrees, the number of n at which the reflectance $R1_{n(5deg)}$ is 1% or less is 150 or more.

19. The optical filter according to claim 16,
wherein the first dielectric multilayer film comprises two or more of the $H_1$ layers, and
when a layer second closest to the phosphate glass in the $H_1$ layers is defined as a second $H_1$ layer, the first dielectric multilayer film comprises a second $M_1$ layer comprising a single layer satisfying a QWOT of 1.2 or more and 2.1 or less or a plurality of layers satisfying a total QWOT of 1.2 or more and 2.1 or less between the first $H_1$ layer and the second $H_1$ layer.

20. The optical filter according to claim 19, wherein the first dielectric multilayer film comprises a third $M_1$ layer comprising a single layer satisfying a QWOT of 1.2 or more and 2.1 or less or a plurality of layers satisfying a total QWOT of 1.2 or more and 2.1 or less between the first $H_1$ layer and the second $M_1$ layer.

21. The optical filter according to claim 16, further satisfying the following spectral characteristics (i-9) to (i-12):
  (i-9) in a spectral transmittance curve at an incident angle of 0 degrees, an average transmittance $T_{1000-1200(0deg)AVE}$ at a wavelength of 1,000 nm to 1,200 nm is 7% or less
  (i-10) in a spectral transmittance curve at an incident angle of 50 degrees, an average transmittance $T_{1000-1200(50deg)AVE}$ at a wavelength of 1,000 nm to 1,200 nm is 7% or less
  (i-11) in a spectral transmittance curve at an incident angle of 0 degrees, a wavelength $IR30_{(0deg)}$ at which a transmittance is 30% is in a wavelength range of 630 nm to 680 nm
  (i-12) in a spectral transmittance curve at an incident angle of 50 degrees, a wavelength $IR30_{(50deg)}$ at which a transmittance is 30% is in a wavelength range of 630 nm to 680 nm.

22. The optical filter according to claim 16, further satisfying the following spectral characteristics (i-17) to (i-20):
  (i-17) an absolute value of a difference between the average transmittance $T_{450-550(0deg)AVE}$ and the average transmittance $T_{450-550(50deg)AVE}$ is 3.5% or less
  (i-18) an absolute value of a difference between the average transmittance $T_{750-1000(0deg)AVE}$ and the average transmittance $T_{750-1000(50deg)AVE}$ is 1.5% or less
  (i-19) an absolute value of a difference between an average transmittance $T_{1000-1200(0deg)AVE}$ at a wavelength of 1,000 nm to 1,200 nm in a spectral transmittance curve at an incident angle of 0 degrees and an average transmittance $T_{1000-1200(50deg)AVE}$ at a wavelength of 1,000 nm to 1,200 nm in a spectral transmittance curve at an incident angle of 50 degrees is 1.5% or less
  (i-20) an absolute value of a difference between a wavelength $IR30_{(0deg)}$ at which a transmittance is 30% in a spectral transmittance curve at an incident angle of 0 degrees and a wavelength $IR30_{(50deg)}$ at which a transmittance is 30% in a spectral transmittance curve at an incident angle of 50 degrees is 15 nm or less.

23. The optical filter according to claim 16, wherein the phosphate glass satisfies all of the following spectral characteristics (ii-1) to (ii-5):
  (ii-1) an internal transmittance $T_{450}$ at a wavelength of 450 nm is 92% or more
  (ii-2) an average internal transmittance $T_{450-600AVE}$ at a wavelength of 450 nm to 600 nm is 90% or more
  (ii-3) a wavelength IR50 at which an internal transmittance is 50% is in a wavelength range of 625 nm to 650 nm
  (ii-4) an average internal transmittance $T_{750-1000AVE}$ at a wavelength of 750 nm to 1,000 nm is 2.5% or less
  (ii-5) an average internal transmittance $T_{1000-1200AVE}$ at a wavelength of 1,000 nm to 1,200 nm is 7% or less.

24. The optical filter according to claim 16, wherein the resin film satisfies all of the following spectral characteristics (iii-1) to (iii-3):
  (iii-1) an internal transmittance $T_{450}$ at a wavelength of 450 nm is 85% or more
  (iii-2) an average internal transmittance $T_{450-600AVE}$ at a wavelength of 450 nm to 600 nm is 90% or more
  (iii-3) a wavelength IR50 at which an internal transmittance is 50% is in a wavelength range of 660 nm to 700 nm.

25. The optical filter according to claim 16, wherein the phosphate glass has a composition comprising, in terms of mass percentage based on oxide,
  40% to 80% of $P_2O_5$,
  0.5% to 20% of $Al_2O_3$,
  0.5% to 20% of $\Sigma R_2O$, where $R_2O$ is one or more components selected from $Li_2O$, $Na_2O$, $K_2O$, $Rb_2O$, and $Cs_2O$, and $\Sigma R_2O$ is a total content of $R_2O$,
  0% to 40% of $\Sigma R'O$, where R'O is one or more components selected from CaO, MgO, BaO, SrO, and ZnO, and $\Sigma R'O$ is a total content of R'O, and
  0.5% to 40% of CuO.

26. The optical filter according to claim 16, wherein the resin film has a thickness of 10 μm or less.

27. An imaging device comprising the optical filter according to claim 16.

* * * * *